(12) United States Patent
Whitehouse

(10) Patent No.: US 9,085,688 B2
(45) Date of Patent: Jul. 21, 2015

(54) PROCESS FOR LATEX PRODUCTION BY MELT EMULSIFICATION

(71) Applicant: Metabolix, Inc., Cambridge, MA (US)

(72) Inventor: Robert S. Whitehouse, Cambridge, MA (US)

(73) Assignee: Metabolix, Inc., Cambridge, MA (US)

( * ) Notice: Subject to any disclaimer, the term of this patent is extended or adjusted under 35 U.S.C. 154(b) by 81 days.

(21) Appl. No.: 13/767,522

(22) Filed: Feb. 14, 2013

(65) Prior Publication Data

US 2013/0225761 A1    Aug. 29, 2013

Related U.S. Application Data

(63) Continuation-in-part of application No. PCT/US2012/035576, filed on Apr. 27, 2012.

(60) Provisional application No. 61/481,027, filed on Apr. 29, 2011.

(51) Int. Cl.
*C08L 67/04* (2006.01)
*C08J 3/05* (2006.01)
*C09D 167/04* (2006.01)

(52) U.S. Cl.
CPC .. *C08L 67/04* (2013.01); *C08J 3/05* (2013.01); *C09D 167/04* (2013.01); *C08J 2367/04* (2013.01)

(58) Field of Classification Search
CPC ......... C08J 3/05; C08J 2367/04; C08L 67/04; C09D 167/04; C09J 167/04
USPC ................. 524/801; 523/318, 333; 528/354
See application file for complete search history.

(56) References Cited

U.S. PATENT DOCUMENTS

| | | |
|---|---|---|
| 4,616,062 A | 10/1986 | Brannon et al. |
| 5,451,456 A | 9/1995 | Marchessault et al. |
| 5,599,891 A | 2/1997 | Horowitz et al. |
| 5,869,567 A | 2/1999 | Fujita et al. |
| 5,891,936 A | 4/1999 | Liddell et al. |
| 5,958,480 A | 9/1999 | Eggink et al. |
| 5,977,250 A | 11/1999 | George et al. |
| 5,993,530 A | 11/1999 | Tanaka et al. |
| 6,024,784 A | 2/2000 | Buisman et al. |
| 6,228,934 B1 | 5/2001 | Horowitz et al. |
| 6,323,276 B2 | 11/2001 | Horowitz et al. |
| 6,605,262 B2 | 8/2003 | Horowitz et al. |
| 6,710,128 B1 | 3/2004 | Helmer et al. |
| 6,716,911 B2 | 4/2004 | Doi et al. |
| 6,900,274 B2 | 5/2005 | Ruckel et al. |
| 7,491,754 B2 | 2/2009 | Senda et al. |
| 7,645,521 B2 | 1/2010 | Wevers et al. |
| 7,666,941 B2 | 2/2010 | Shiba et al. |
| 7,763,676 B2 | 7/2010 | Moncla et al. |
| 7,799,864 B2 | 9/2010 | Wevers et al. |
| 7,879,189 B2 | 2/2011 | Dyer et al. |
| 2005/0100754 A1 | 5/2005 | Moncla et al. |

FOREIGN PATENT DOCUMENTS

| | | |
|---|---|---|
| DE | 40 40 158 A1 | 6/1992 |
| WO | WO 95/15260 A1 | 6/1995 |
| WO | WO 97/04036 A1 | 2/1997 |
| WO | WO/2011/024023 | 3/2011 |

OTHER PUBLICATIONS

Alain Dufresneand and Eric Samain, "Preparation and Characterization of a Poly (β-hydroxyoctanoate) Latex Produced by *Pseudomonas oleovorans*," *Macromolecules*, 31, 6426-6433 (1998).
International Search Report, International Application No. PCT/US2012/035576 "Process for Latex Production by Melt Emulsification", Date of Search: Jul. 11, 2012.
Lauzier, C. A., et al., "Film formation and paper coating with poly (β-hydroxyalkanoate), a biodegradable latex," *Tappi Journal*, 76(5): 71-77 (May 1993).
International Preliminary Report on Patentability, PCT/US2012/035576, "Process for Latex Production by Melt Emulsification," dated Nov. 7, 2013.

*Primary Examiner* — Tae H Yoon
(74) *Attorney, Agent, or Firm* — Hamilton, Brook, Smith & Reynolds, P.C.

(57) ABSTRACT

A method for producing an aqueous PHA emulsion or latex comprising predominantly amorphous PHA polymers or copolymers with polymer dispersants or surfactants is described.

34 Claims, 1 Drawing Sheet

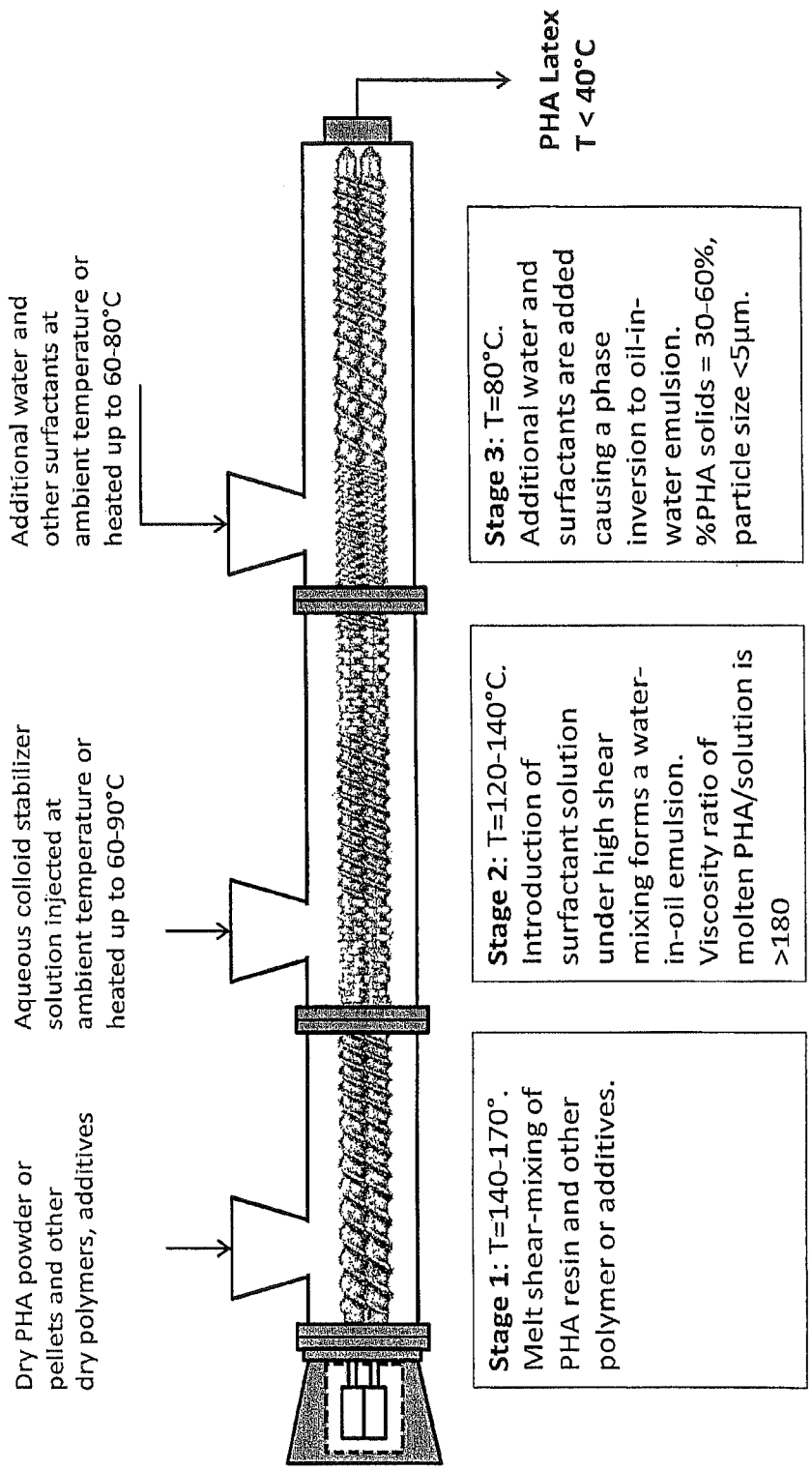

PROCESS FOR LATEX PRODUCTION BY MELT EMULSIFICATION

RELATED APPLICATIONS

This application is a continuation-in-part of International Application No. PCT/US2012/035576, which designated the United States and was filed on Apr. 27, 2012, published in English, which claims the benefit of U.S. Provisional Application No. 61/481,027 filed on Apr. 29, 2011. The entire teachings of the above applications are incorporated herein by reference

BACKGROUND OF THE INVENTION

Biobased, biodegradable polymers such as polyhyroxyalkanoates (PHA's), have been produced in a variety of biomass systems such as plant biomass, microbial biomass (e.g., bacteria including cyanobacteria, yeast, fungi) and algal biomass. Genetically-modified biomass systems have recently been developed which produce a wide range of biodegradable PHA polymers and copolymers in high yield (Lee (1996), *Biotechnology & Bioengineering,* 49: 1-14; Braunegg et. al. (1998), *J. Biotechnology,* 65:127-161; Madison and Huisman (1999), Metabolic Engineering of Poly-3-Hydroxyalkanoates; From DNA to Plastic, in *Microbiol. Mol. Biol. Rev.,* 63:21-53). The PHA's produced from biomass systems are made using renewable feedstocks, are of high molecular weight and are hydrolytically stable but can biodegrade in a number of microbial environments including soil, marine and home or industrial composters.

PHA's can be thermally processed into products in much the same way as petroleum-based thermoplastic polymer materials. Applications for PHA polymers include mulch films, nonwoven fibers, extruded foams, injection molded utensils and thermoformed trays to name a few. One industrially important processing route for PHA materials is the conversion of the polymer into an aqueous PHA emulsion or dispersion (also referred to as a latex) where the PHA is present as an amorphous colloidal particle (median diameter of 0.01-1 µm) suspended in water. Commercial applications for PHA emulsions include paints, architectural coatings, adhesives, wood lacquers, paper coatings as well as binders for time-released agricultural chemicals.

Several published patents describe processes for making emulsions from biodegradable polymers. U.S. Pat. No. 6,103,858 (BASF) describes a process for forming a latex from poly(butylene-adipate-terephthalate) which is a petroleum-based biodegradable polyester. The process, however, includes the added steps of first increasing the molecular weight of the polymer by reacting it with chain extenders, such as diisocyanates, then dissolving the polymer into an organic solvent followed by dispersion in water and finally removal of the organic solvent by vacuum distillation. The patent makes no reference to a process of making a polyester emulsion in the absence of organic solvent addition. One would further expect that the resultant emulsion would have residual amounts of solvent present in the final latex and hence contribute to a VOC (volatile organic compound) issue in practical use. U.S. Pat. No. 6,716,911 (Showa High Polymer Co. Ltd) describes a process for producing latexes from petroleum-based biodegradable polyesters (poly(butylene-succinate), poly(butylene-succinate-adipate)). A twin-screw extruder is used to melt process the polyesters with a 1% aqueous surfactant solution to give a latex dispersion. In this process, no organic solvents are used, however the patent describes the need for having a viscosity ratio between the molten polyester and the surfactant solution of <150. This indicates that the polyesters are of fairly low molecular weight and therefore have low melt temperatures and tensile strengths that limit the final properties of films produced from the latex. U.S. Pat. No. 6,103,858 (Metabolix) describes a process for producing latexes from biobased, biodegradable polyhydroxyalkanoate (PHA) polyesters. This is a multi-step process where the first step involves forming a PHA suspension from biomass containing the PHA using an aqueous recovery process involving cell digestion, washing with surfactant/peroxide followed by microfluidization, centrifugation and re-suspension of the PHA particles in water. The final step to produce an amorphous PHA latex involved heating the suspension under pressure to 190° C.-200° C. (25° C. above melt temperature of PHA) followed by rapid cooling. While the process was shown to produce aqueous PHA emulsions (latexes) with acceptable properties on a small scale, it is cost prohibitive to scale up due to the complexity of the steps required to generate the latex as well as the need for high pressure processing equipment.

The processes described above for producing latexes from biodegradable polyesters all require the polymers to be processed substantially above the melting point of the specific polyester before being combined with water or a solvent diluents before subsequent dispersion to form a latex product with an acceptably small particle size. The introduction of water as the solvent well above the boiling point of the liquid also requires high pressure containment equipment and substantial safety controls which are not typical for most latex processing equipment designs.

There is a need, therefore, to develop a simplified, more cost effective and environmentally friendly process for making biobased, biodegradable latexes from renewable resources.

SUMMARY OF THE INVENTION

Disclosed herein are materials and methods for producing renewable, biobased, biodegradable latexes. As used herein, a latex includes an aqueous suspension of polymer particles having a median particle diameter of about 0.01 to about 5 µm that are prevented from subsequent agglomeration through use of a colloid stabilizer system that may comprise anionic, cationic, non-ionic or polymeric dispersant types or mixtures thereof.

In a certain aspect, the invention relates to a process for producing latex dispersions (aqueous PHA emulsions) comprised of polyhydroxyalkanoate particles from polymer, copolymer or polymer/copolymer blends suspended in water along with stabilizing additives and optionally water soluble polymers such as polyvinyl acetate or polyvinyl alcohol.

In methods described herein, a biobased, biodegradable polyhydroxyalkanoate (PHA) latex is produced initially by melting at least one PHA polymer or copolymer at a temperature above its highest Tm e.g., at about 160° C. to about 170° C., producing a melt which has a viscosity of about 800 Pas to 2500 Pas, and then optionally adding other polymer materials, plasticizers, emulsification additives or fillers producing a homogeneous molten composition; the temperature of the molten mass is then lowered, with continuous mixing, to a temperature about 20° C. to about 50° C. below the Tm of the highest melting polymer component e.g., about 120° C. to about 140° C. and then an aqueous solution containing colloid stabilizers is added into the molten PHA which then undergoes a high shear or high distributive mixing event to produce a water-in-PHA dispersion; a second aqueous solution containing only water or pH adjusting aids and optionally more colloid stabilizers (same or different from the first step aqueous addition) is then added to the water-in-PHA emulsion which then undergoes another high shear or high distributive mixing event producing a PHA-in-water emulsion; the temperature of the dispersion is lowered to about 80° C. and finally dispensing the formed latex (aqueous PHA emulsion) below about 40° C.

In a first embodiment of the methods described herein, the ratio of the viscosity of the molten PHA to the aqueous polymer surfactant solution is greater than about 200:1

In an another aspect of the methods described herein, the aqueous solutions may contain from 1% to 50% colloid stabilizer or additives at either addition stage and the final ratio of colloid stabilizer to PHA polymer is preferably 0.1 to 8 parts to 100 parts by dry weight PHA polymer. A colloid system or stabilizing agent acts to form or stabilize a colloid suspension. In other embodiments of any of the aspects or embodiments described herein, the colloid stabilizer solution (also referred to as a colloid stabilizer system) comprises about 5% to about 35% of a water soluble polymer, for example, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34% or about 35%.

In the methods described herein, the aqueous colloid solution may be heated above ambient temperature from about 60° C. to about 90° C. prior to mixing with the molten PHA, which facilitates easier mixing and minimizes severe temperature shocks during the mixing process. Alternatively, the aqueous colloid solution may be added at room temperature to the molten PHA. In other embodiments, the aqueous colloid solution is added in the temperature range of about 10° C. above or below room temperature.

In another embodiment of the methods described herein, the colloid stabilizer component of the colloid solution can include partially or fully hydrolysed polyvinyl alcohol, polyvinyl acetate solid polymer, copolymers of vinyl acetate with vinyl esters (acrylic, methacrylic and crotonic), soaps of fatty acids, polyvinyl pyrrolidones, ethylene oxide-propylyene oxide non ionic surfactants that have cloud points above 90° C., and polymeric disperants having free carboxylic acids side chains. The materials for producing a latex comprise biodegradable polyhydroxyalkanoate (PHA) polymers, copolymers and their blends produced by genetically engineered microbes via a fermentation process. In certain embodiments, the biologically-produced polyhydroxyalkanoate polymer is a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), or a poly(3-hydroxybutyrate-co-3-hydroxyhexanoate).

In other embodiments of the methods described herein, the biologically-produced polyhydroxyalkanoate polymer is a poly(3-hydroxybutyrate) homopolymer, a poly(3-hydroxybutyrate-co-4-hydroxybutyrate) with 5% to 15% 4-hydroxybutyrate content, a poly(3-hydroxybutyrate-co-3-hydroxyvalerate) with 5% to 22% 3-hydroxyvalerate content, a poly (3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content.

In still other embodiments of the methods described herein, the biologically-produced polyhydroxyalkanoate is a) a poly (3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyvalerate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate); a) a poly(3-hydroxybutyrate-co-4-hydroxybutyrate) blended with b) a poly(3-hydroxybutyrate-co-3-hydroxyhexanoate) or a) a poly(3-hydroxybutyrate-co-3-hydroxyvalerate) blended with b) a poly(3-hydroxybutyrate-co-3-hydroxyhexanoate). The biologically-produced polyhydroxyalkanoate is a) a poly (3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content.

In other embodiments of the methods described herein, the biologically-produced polyhydroxyalkanoate is a) a poly(3-hydroxybutyrate) homopolymer blended with b) a poly(3-hydroxybutyrate-co-4-hydroxybutyrate) and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) is 5% to 95% of the combined weight of polymer a) and polymer b); a) a poly(3-hydroxybutyrate) homopolymer blended to with b) a poly(3-hydroxybutyrate-co-3-hydroxyhexanoate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) is 5% to 95% of the combined weight of polymer a) and polymer b); or a) a poly(3-hydroxybutyrate-co-3-hydroxyvalerate) blended with b) a poly(3-hydroxybutyrate-co-3-hydroxyhexanoate) and the weight of polymer a) is 5% to 95% of the combined weight of polymer a) and polymer b).

In other embodiments of the methods described herein, the weight of polymer a) is 20% to 60% of the combined weight of polymer a) and polymer b) and the weight of polymer b) is 40% to 80% of the combined weight of polymer a) and polymer b). The biologically-produced polyhydroxyalkanoate is a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co- 3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b) a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content.

In other embodiments of the methods described herein, the biologically-produced polyhydroxyalkanoate is a) a poly(3-hydroxybutyrate) homopolymer blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b).

In other embodiments of the methods described herein, the weight of polymer a) is 20% to 60% of the combined weight of polymer a) and polymer b) and the weight of polymer b is 40% to 80% of the combined weight of polymer a) and polymer b).

In still other embodiments of the methods described herein, the biologically-produced polyhydroxyalkanoate is further blended with polymer c) a poly(3-hydroxybutyrate-co-4-hydroxybutyrate) with a 20% to 50% 4-hydroxybutyrate content. The biologically-produced polyhydroxyalkanoate is further blended with c) a poly(3-hydroxybutyrate-co-5-hydroxyvalerate) with a 20% to 50% 5-hydroxyvalerate content. The biologically-produced polyhydroxyalkanoate further blended with c) a poly(3-hydroxybutyrate-co-3-hydroxyhexanoate) with a 5% to 50% 3-hydroxyhexanoate content. The weight of polymer c) is 5% to 95% of the combined polymer weight of polymer a), polymer b) and polymer c). The weight of polymer c is 5% to 40% of the combined polymer weight of polymer a), polymer b) and polymer c).

Also provided herein are biologically-produced polyhdyroxyalkanoates having high molecular weights (for example, about 300,000 to about 800,000 Daltons (e.g., 350,000 Daltons; 400,000 Daltons; 450,000 Daltons; 500,000 Daltons; 550,000 Daltons; 600,000 Daltons; 650,000 Daltons; or 700,000 Daltons; 750,000 Daltons) with high melt temperatures of about 160° C. to about 170° C.).

In certain methods of the methods described herein, a PHA is melt blended with another biodegradable polymer to form a latex. The other biodegradable polymers include polycaprolactone having a molecular weight from about 1000 to 1,000,000 Daltons; aliphatic polyesters derived from a diol and diacid comprising at least one diol selected from ethylene glycol, polyethylene glycol, butane diol, 1,2-hexane diol, 1,3-propylene glycol and at least one diacid selected from adipic acid, succinic acid, terephthalic acid or furan dicarboxylic acid. The weight percent of the non-PHA polymer in the blend is ≤20%.

In certain embodiments of the methods, an emulsification additive is further added.

In the methods provided herein, the melt blending of the PHA with the colloid stabilizer solution takes place in a co-rotating or counter rotating twin screw extruder (TSE).

In the methods provided herein, the median particle size of the PHA in the latex is less than or equal to 20 µm, less than or equal to 15 µm, less than or equal to 10 µm, less than or equal to 5 µm (e.g., less than or equal to 4.5 µm; less than or equal to 4.0 µm; less than or equal to 3.5 µm; less than or equal to 3.0 µm; less than or equal to 2.5 µm; less than or equal to 2.0 µm; less than or equal to 1.5 µm; less than or equal to 1.0 µm; less than or equal to 0.5 µm; less than or equal to 0.2 µm) and the particles have a percent crystallinity of less than 50% (e.g., 45%, 40%, 35%, 30%, 25%, 20%, 15%, 10%, 5%, 4.5%, 4.0%, 3.5%, 3%, 2.5%, 2%, 1.5%, 1%). The PHA latex particles can also be 100% amorphous.

In the methods provided herein, the percent PHA solids in the final latex is 30-60% by weight (for example, 35-55%, 40-50%, 30-50%, 30-40%, or integers between these ranges, such as 36%, 37%, 38%, 39%).

In the methods provided herein, other additives such as liquid or solid plasticizers, pigments, nucleating agents, starches, biocides, and viscosity modifiers can also be added to the PHA latex.

Other features and advantages of the invention described by the methods and compositions will be apparent from the following detailed description, and from the claims.

In an aspect of the invention, a method for producing an aqueous polyhydroxyalkanoate (PHA) emulsion from a bio-based, biodegradable PHA polymer, copolymer or blends thereof is described. The method includes melting the PHA polymer, copolymer or blends thereof; lowering the temperature of the PHA polymer melt to about 20° C. to about 50° C. below the Tm of the PHA polymer with the highest Tm; combining the PHA polymer, copolymer or blends thereof and an aqueous colloid stabilizer solution under high shear or high distributive mixing thereby forming a water-in-PHA emulsion; lowering the temperature by about 20° C. to about 50° C. of the water-in-PHA emulsion; and adding water and optionally one or more polymeric dispersants or surfactants producing a aqueous PHA emulsion. In a first embodiment of the first aspect, the aqueous PHA emulsion comprises a 3-hydroxybutyrate polymer, copolymer or blends thereof.

In an embodiment, the aqueous PHA emulsion comprises 4-hydroxybutyrate polymer, copolymer or blends thereof. In another embodiment, the aqueous PHA emulsion comprises a 3-hydroxybutyrate-co-4-hydroxybutyrate copolymer. In yet another embodiment, the aqueous PHA emulsion comprises a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), or a poly(3-hydroxybutyrate-co-3-hydroxyhexanoate).

Also included in the methods described herein, the aqueous PHA emulsion comprises a poly(3-hydroxybutyrate) homopolymer, a poly(3-hydroxybutyrate-co-4-hydroxybutyrate) with 5% to 15% 4-hydroxybutyrate content, a poly(3-hydroxybutyrate-co-3-hydroxyvalerate) with 5% to 22% 3-hydroxyvalerate content, a poly(3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content. In a sixth embodiment of the first aspect, the aqueous PHA emulsion comprises a) a poly(3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyvalerate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate); a) a poly(3-hydroxybutyrate-co-4-hydroxybutyrate) blended with b) a poly(3-hydroxybutyrate-co-3-hydroxyhexanoate) or a) a poly(3-hydroxybutyrate-co-3-hydroxyvalerate) blended with b) a poly(3-hydroxybutyrate-co-3-hydroxyhexanoate).

In still another embodiment, the aqueous PHA emulsion comprises a) a poly(3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content. In an eighth embodiment of the first aspect, the aqueous PHA emulsion comprises a) a poly(3-hydroxybutyrate) homopolymer blended with b) a poly(3-hydroxybutyrate-co-4-hydroxybutyrate) and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) can be 5% to 95% of the combined weight of polymer a) and polymer b); a) a poly(3-hydroxybutyrate) homopolymer blended to with b) a poly(3-hydroxybutyrate-co-3-hydroxyhexanoate) and the weight of polymer a) can be 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) can be 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) can be 5% to 95% of the combined weight of polymer a) and polymer b); or a) a poly(3-hydroxybutyrate-co-3-hydroxyvalerate) blended with b) a poly(3-hydroxybutyrate-co-3-hydroxyhexanoate) and the weight of polymer a) can be 5% to 95% of the combined weight of polymer a) and polymer b). In a further embodiment of the eighth embodiment of the first aspect, the weight of polymer a) is 20% to 60% of the combined weight of polymer a) and polymer b) and the weight of polymer b) or 40% to 80% of the combined weight of polymer a) and polymer b).

In other embodiments, the aqueous PHA emulsion comprises a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co-3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b) a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly (3-hydroxybutyrate-co-3-hydroxyhexanoate) having a 5%-50% 3-hydroxyhexanoate content. In a tenth embodiment of the first aspect, the aqueous PHA emulsion comprises a) a poly(3-hydroxybutyrate) homopolymer blended with b) a poly(3-hydroxybutyrate-co-4-hydroxybutyrate) with a 20-50% 4-hydroxybutyrate content and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) can be 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) can be 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) can be 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) can be 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b). In another embodiment of the tenth embodiment of the first aspect, the aqueous PHA emulsion comprises 20% to 60% of the combined weight of polymer a) and polymer b) and the weight of polymer b can be 40% to 80% of the combined weight of polymer a) and polymer or polymer c) a poly(3-hydroxybutyrate-co-4-hydroxybutyrate) with a 20% to 50% 4-hydroxybutyrate content or c) a poly(3-hydroxybutyrate-co-5-hydroxyvalerate) with a 20% to 50% 5-hydroxyvalerate content or c) a poly(3-hydroxybutyrate-co-3-hydroxyhexanoate) with a 5% to 50% 3-hydroxyhexanoate content.

In any of the methods described herein, the aqueous PHA emulsion is processed using a counter-rotating or co-rotating twin screw extruder.

Also included, the aqueous PHA emulsion comprises a blend of poly(3-hydroxybutyrate) with one or more other PHA copolymers and optionally a dispersant in the blend, wherein the dispersant is a non PHA polymer. In a further embodiment of the twelfth embodiment, the PHA is a copolymer of poly(3-hydroxybutyrate-co-11%-4-hydroxybutyrate). In another embodiment, the non PHA polymer dispersant is selected from polycaprolactone, aliphatic polyesters derived from condensation of a diol and a diacid, polyvinyl acetate, vinyl acetate copolymerized with ethylene, vinyl acetate copolymerized with acrylate, methacrylate or crotonic acid mononmers having at least 50% vinyl acetate content, an acrylate or methacrylate homopolymers or copolymers with optional styrene, starch, casein, hydroxymethylcellulose or other biobased polymer. In certain aspects, the aqueous colloidal stabilizer system comprises about 1% to about 50% aqueous solution of polyvinyl alcohol, partially hydrolysed polyvinyl alcohol or partially saponified polyvinyl alcohol. In certain methods, the aqueous colloidal stabilizer system comprises about 1% to about 50% aqueous solution of vinyl alcohol, partially hydrolysed vinyl alcohol or partially saponified vinyl alcohol.

The surfactant in the aqueous colloidal stabilizer system of certain methods is comprised of soaps of fatty acids, pyrrolidones, ethylene glycol, polyethylene glycol, ethylene oxides or propylene oxides, in certain aspects, the surfactant in the aqueous colloid system has a cloud point greater than 90° C. In certain embodiments of the first aspect, the surfactant colloid system is heated to about 60° C. to about 90° C. prior to injection into the molten PHA and the ratio of the viscosity of the molten PHA to the surfactant solution is greater than about 180. In certain embodiments of the first aspect, the surfactant colloid system is injection at room temperature into the molten PHA. In certain embodiments of the first aspect, the PHA polymer, copolymer or blends thereof can have one or more of the following properties, the molecular weight of the PHA is from about 300,000 daltons to about 800,000 daltons, the melting temperature of the PHA is about 140° C. to about 170° C., the percent solids in the PHA latex are 30 to 60% by weight, the median particle size of the PHA solids is less than 20 µm. In a second aspect of the invention of the first aspect, additives selected from the group consisting of pigments, texturizers, UV stabilizers, inorganic fillers and biocides, wherein the additives are included post emulsification are included. In a third aspect, an aqueous paint emulsion produced from the method of the first aspect is described herein.

In another embodiment, the aqueous PHA emulsion comprises polyhydroxylbutyrate (PHB) and at least two PHA copolymers, wherein each copolymer has a first and a second monomer, wherein the second copolymer has an increasing weight fraction of the second PHA monomer than the first copolymer, and the third copolymer has an increasing weight fraction of the second PHA monomer than the second copolymer. In certain embodiment, the second monomer is selected from 4HB, 3HH, 5HV or 3HO and the first monomer is 3HB. In a fourth aspect, a dry PHA film is produced from the drying of a aqueous PHA emulsion that readily film forms at 5° C. or above without the use of volatile solvents or plasticizers and has a dried film crystallinity as measured by DSC from about 3% to about 50%.

In other embodiment, the dry PHA film comprises from about 20% to 95% PHA polymers, from about 0.1 to about 8% aqueous colloid stabilizer solution and from about 0% to about 75% a non PHA polymer miscible in the melt with the PHA resin but not necessarily miscible at room temperature. In certain embodiments, the dry PHA film has crystalline phase and a single amorphous phase. In still another embodiment, the PHA film or coating is produced from the drying of an aqueous PHA emulsion, wherein the dry PHA film comprises at least one crystalline phase and more than one amorphous phase. In another embodiment, the dry PHA coating does not fully form a film but is retained on the substrate by the colloid stabilizer component. A coherent film can then be formed when the coating is heated to 10-50° C. above the highest Tm of the PHA polymer for a period of 0.1-5 seconds.

BRIEF DESCRIPTION OF THE DRAWINGS

The FIGURE is a schematic of an exemplary PHA dispersion process using Twin screw Extruder. Optionally, the water and the surfactant can be added at the same time in Stage 2.

DETAILED DESCRIPTION OF THE INVENTION

A description of example embodiments of the invention follows.

The present invention comprises materials and processes to manufacture a biobased, biodegradable aqueous suspension with polyhydroxyalkanoate (PHA's) polymers or copolymers. The suspension produced is a latex which is defined as a colloidal suspension (PHA median particle size about 0.01 to about 5 µm) that is stabilized by the addition of a surfactant (anionic, cationic, non-ionic) and/or polymeric dispersants. The term "emulsion" or "dispersion" also refers a "latex." Distributive mixing is the process of spreading the minor component throughout the matrix in order to obtain a good spatial distribution. Elongational forces of distributive mixing are effective at enhancing dispersion when compared to sheer forces.

Particle size influences many of the properties of a latex. The terms "mean" and "median" when describing particle size are equivalent when the particle distribution is symmetric. The mean value is associated with the basis of the distribution calculation. Median values are defined as the value where half of the population resides above this point, and half resides below this point. For particle size distributions, the median is D50, the size in microns that splits the distribution with half above and half below this diameter.

In one embodiment, a twin screw extruder is used to melt mix a molten PHA polymer, copolymer or blends thereof with an aqueous polymer surfactant solution in a continuous process. In the first stage of the process, a PHA polymer is melt-shear mixed at a temperature of about 160° C. to about 180° C. In another embodiment, additives such as plasticizers, emulsification aids, viscosity modifiers, dispersants, starches, other polymer materials or fillers can also be melt-shear mixed with the PHA in the first stage at a temperature above Tm of the PHA e.g. about 160° C. to about 170° C. forming a homogeneous molten composition having a melt viscosity of 800-2500 Pas; in the second stage of the process, the temperature of the molten mass is then lowered with continuous mixing to a temperature of about 20° C. to about 50° C. below the Tm of the PHA e.g., to about 120° C. to about 140° C. and then an aqueous solution containing colloid stabilizers is added into the molten PHA which then undergoes a high shear or high distributive mixing event (or a combination) to produce a water-in-PHA dispersion; in the third stage of the process, a second aqueous solution containing only water or pH adjusting aids and optionally more colloid stabilizers (same or different from those added in the second stage) is added which then undergoes a high shear or high distributive mixing event producing an PHA-in-water emulsion. The temperature of the dispersion is lowered to below about 80° C. and finally the formed latex is dispensed below about 40° C.

The FIGURE shows a schematic drawing of the three stage latex process. The ability to process PHA's below their melting point is due to their propensity for slower recrystallization from the melt. This is not the case for other thermoplastic polymers such as polypropylene which "freeze" or become solid during processing as soon as they are cooled to below their melt temperature and therefore are incapable of forming emulsions at lower temperatures.

Co-rotating or counter-rotating twin screw extruders are the preferred processing equipment for carrying out PHA latex production. The high shear or distributing mixing screw elements are particularly needed to form the initial water-in-PHA dispersion from the molten PHA. Other mixing equipment that could be utilized includes colloid mills, high shear dispersers, homogenizers and the like.

The concentration of the PHA solids is about 30% to about 50% by weight in the final latex while the median size of the PHA latex particles produced are 3 µm in diameter or less and the percent crystallinity of the particles is less than or equal to about 50%, about 40%, about 30%, about 20%, about 10%, about 5%. In certain embodiments, the concentration of PHA solids is about 30%, about 31% about 32%, 33%, about 34% about 35%, about 36%, about 37% about 38%, about 39%, about 40%, about 41% about 42%, 43%, about 44% about 45%, about 46%, about 47% about 48%, about 49%, or about 50%. At any of the these concentrations the median particle size of the PHA latex particles is 3 μm in diameter or less than 3 μm in diameter, at or less than 2.9 μm in diameter, at or less than 2.8 μm in diameter, at or less than 2.7 μm in diameter, at or less than 2.6 μm in diameter, at or less than 2.5 μm in diameter, at or less than 2.4 μm in diameter at or less than 2.3 μm in diameter, at or less than 2.2 μm in diameter, at or less than 2.1 μm in diameter, at or less than 2.0 μm in diameter, at or less than 1.9 μm in diameter, at or less than 1.8 μm in diameter, at or less than 1.7 μm in diameter, at or less than 1.6 μm in diameter, at or less than 1.5 μm in diameter, at or less than, 1.4 μm in diameter, at or less than 1.3 μm in diameter, at or less than 1.2 μm in diameter, at or less than 1.1 μm in diameter, at or less than 1.0 μm in diameter, at or less than 0.9 μm in diameter, at or less than 0.8 μm in diameter, at or less than, 0.7 μm in diameter, at or less than 0.6 μm in diameter, at or less than 0.5 μm in diameter, at or less than, 0.4 μm in diameter, at or less than 0.3 μm in diameter, at or less than 0.2 μm in diameter, at or less than, 0.1 μm in diameter, at or less than 0.5 μm in diameter, at or less than 0.01 μm in diameter.

The small particle size contributes to maintaining the film forming properties of the PHA latex. The reason for this is that the PHA particles need to be amorphous in order to form a continuous film once it is applied to a surface and the water removed. However, once the film is formed and dried, it slowly crystallizes over time producing a hard durable coating without the need for additives like crosslinking or curing agents. The high molecular weight of the starting PHA polymer or copolymer is the primary reason for the superior properties of the final coating.

As shown by Horowitz et. al. (*J. Am. Chem. Soc.* 1994, 116, 2695-2702), amorphous PHA particles can remain noncrystalline almost indefinitely, even when undercooled about 100° C. or more below the crystalline melting temperature, provided they are of sufficiently small size and behave independently from each other, as they do in aqueous suspension. This surprising stability in the amorphous state has been explained based on nucleation kinetics (de Koning and Lemstra, *Polymer* 1992, 33, 3292-3294). The theoretical model predicts that the observed rate of crystallization for an ensemble of polymer particles varies inversely with the particle volume (i.e. the third power of particle diameter). The half-time for the crystallization process can be expressed as $(\log_e 2)/\text{Iv}$, where I is the nucleation rate constant and v is the volume of an individual particle. Using known nucleation rate constant data (Organ and Barham, *J. Mater. Sci.* 1991, 26, 1368-1374), the half-times for crystallization of suspensions of poly(3-hydroxybutyrate) and poly(3-hydroxybutyrate-co-valerate) PHA particles are calculated in Table 1.

TABLE 1

Predicted half-times for crystallization of a suspensions of amorphous particles at about 30° C.; PHB = poly-3-hydroxybutyrate, PHBV = poly-3-hydroxybutyrate-co-7%-hydroxyvalerate.

| Particle Size | PHB | PHBV (Biopol) |
|---|---|---|
| 100 μm | ~1 min | ~5 min |
| 20 μm | 2 hours | 10 hours |
| 5.0 μm | 6 days | 30 days |
| 1.0 μm | 2 years | 10 years |
| 0.2 μm | 262 years | 1310 years |

It has been found experimentally that the presence of even a modest fraction of crystalline polymer particles in the suspension results in an inferior, porous and irregular film under ambient temperature conditions, since particle coalescence does not occur. However, continuous films of PHA can still be formed even when the formed latex particles are partially crystalline. This is accomplished by having the PHA retained on the substrate surface by the surfactant colloid stabilizer or other polymers which may be added to the latex. Once the film is dried it can then be heated up to 10-50° C. above the highest Tm of the PHA polymer for a period of 0.1 to 5 s to form a coherent film.

Polyhydroxyalkanoates

Polyhydroxyalkanoates (PHA's) are biological polyesters synthesized by a broad range of natural and genetically engineered bacteria as well as genetically engineered plant crops (Braunegg et al., (1998), *J. Biotechnology* 65:127-161; Madison and Huisman, 1999, *Microbiology and Molecular Biology Reviews*, 63:21-53; Poirier, 2002, *Progress in Lipid Research* 41:131-155). These polymers are biodegradable thermoplastic materials, produced from renewable resources, with the potential for use in a broad range of industrial applications (Williams & Peoples, *CHEMTECH* 26:38-44 (1996)). In certain embodiments of the invention, the biomass host is bacteria, yeast, fungi, algae, cyanobacteria, or a mixture of any two or more thereof. The bacteria includes but is not limited to *Escherichia coli, Alcaligenes eutrophus* (renamed as *Ralstonia eutropha*), *Bacillus* spp., *Alcaligenes latus, Azotobacter, Aeromonas, Comamonas, Pseudomonads), Pseudomonas, Ralstonia, Klebsiella), Synechococcus* sp PCC7002, *Synechococcus* sp. PCC 7942, *Synechocystis* sp. PCC 6803, and *Thermosynechococcus elongatus* BP-I (cyanobacteria), *Chlorobium tepidum* (green sulfur bacteria), *Chloroflexusauranticus* (green non-sulfur bacteria), *Chromatium tepidum* and *Chromatium vinosum* (purple sulfur bacteria), *Rhodospirillum rubrum, Rhodobacter capsulatus*, and *Rhodopseudomonas palusris*. In other embodiments, the recombinant host is an algae. The algae include but are not limited to *Chlorella minutissima, Chlorella emersonii, Chlorella sorokiniana, Chlorella ellipsoidea, Chlorella* sp., or *Chlorella prototheoides*

In general, a PHA is formed by enzymatic polymerization of one or more monomer units inside a living cell. Over 100 different types of monomers have been incorporated into the PHA polymers (Steinbüchel and Valentin, 1995, *FEMS Microbiol. Lett.* 128:219-228. Examples of monomer units incorporated in PHAs include 2-hydroxybutyrate, lactic acid, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HHep), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center.

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as P3HB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the starting (initial) PHA for use in the methods is a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

By selecting the monomer types and controlling the ratios of the monomer units in a given PHA copolymer a wide range of material properties are achieved. Although examples of PHA copolymers having two different monomer units have been provided, the PHA can have more than two different monomer units (e.g., three different monomer units, four different monomer units, five different monomer units, six different monomer units). An example of a PHA having 4 different monomer units is PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably about 85% by weight of the total monomers, most preferably greater than 90% by weight of the total monomers, for example: about 92%, about 93%, about 94%, about 95%, about 96% by weight of the copolymer and the HX comprises one or more monomers selected from 3HH, 3HO, 3HD, 3HDd.

The homopolymer (where all monomer units are identical) P3HB and 3-hydroxybutyrate copolymers (P3HB3HP, P3HB4HB, P3HB3HV, P3HB4HV, P3HB5HV, P3HB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature ($T_g$) in the range of about 6° C. to about −10° C., and a melting temperature Tm of between about 80° C. to about 180° C. Type 2 PHB copolymers typically have a $T_g$ of about −20° C. to about −50° C. and Tm of about 55° C. to about 90° C. In particular embodiments, the Type 2 copolymer has a phase component with a $T_g$ of about −15° C. to about −45° C. and no Tm.

Preferred Type 1 PHB copolymers have two monomer units have a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of about 3% to about 22% by weight of the polymer and preferably in the range of 4% to 15% by weight of the copolymer, for example: about 4% 3HV; about 5% 3HV; about 6% 3HV; about 7% 3HV; about 8% 3HV; about 9% 3HV; about 10% 3HV; about 11% 3HV; about 12% 3HV; about 13% 3HV; about 14% 3HV; about 15% 3HV.

PHB3HP is a Type 1 PHB copolymer where the 3HP content is in the range of about 3% to about 15% by weight of the copolymer and preferably in the range of about 4% to about 15% by weight of the copolymer for example: about 4% 3HP; about 5% 3HP; about 6% 3HP; about 7% 3HP; about 8% 3HP; about 9% 3HP; about 10% 3HP; about 11% 3HP; about 12% 3HP; about 13% 3HP; about 14% 3HP; about 15% 3HP.

PHB4HB is a Type 1 PHB copolymer where the 4HB content is in the range of about 3% to about 15% by weight of the copolymer and preferably in the range of about 4% to about 15% by weight of the copolymer, for example: about 4% 4HB; about 5% 4HB; about 6% 4HB; about 7% 4HB; about 8% 4HB; about 9% 4HB; about 10% 4HB; about 11% 4HB; about 12% 4HB; about 13% 4HB; about 14% 4HB; about 15% 4HB.

PHB4HV is a Type 1 PHB copolymer where the 4HV content is in the range of about 3% to about 15% by weight of the copolymer and preferably in the range of about 4% to about 15% by weight of the copolymer, for example: about 4% 4HV; about 5% 4HV; about 6% 4HV; about 7% 4HV; about 8% 4HV; about 9% 4HV; about 10% 4HV; about 11% 4HV; about 12% 4HV; about 13% 4HV; about 14% 4HV; about 15% 4HV.

PHB5HV is a Type 1 PHB copolymer where the SHY content is in the range of about 3% to about 15% by weight of the copolymer and preferably in the range of about 4% to about 15% by weight of the copolymer for example: about 4% 5HV; about 5% 5HV; about 6% 5HV; about 7% 5HV; about 8% 5HV; about 9% 5HV; about 10% 5HV; about 11% 5HV; about 12% 5HV; about 13% 5HV; about 14% 5HV; about 15% 5HV.

PHB3HH is a Type 1 PHB copolymer where the 3HH content is in the range of about 3% to about 15% by weight of the copolymer and preferably in the range of about 4% to about 15% by weight of the copolymer for example: about 4% 3HH; about 5% 3HH; about 6% 3HH; about 7% 3HH; about 8% 3HH; about 9% 3HH; about 10% 3HH; about 11% 3HH; about 12% 3HH; about 13% 3HH; about 14% 3HH; about 15% 3HH;

PHB3HX is a Type 1 PHB copolymer where the 3HX content is comprised of 2 or more monomers selected from 3HH, 3HO, 3HD and 3HDd and the 3HX content is in the range of about 3% to about 12% by weight of the copolymer and preferably in the range of about 4% to about 10% by weight of the copolymer for example: about 4% 3HX; about 5% 3HX; about 6% 3HX; about 7% 3HX; about 8% 3HX; about 9% 3HX; about 10% 3HX by weight of the copolymer.

Type 2 PHB copolymers have a 3HB content of between about 80% and about 5% by weight of the copolymer, for example about 80%, about 75%, about 70%, about 65%, about 60%, about 55%, about 50%, about 45%, about 40%, about 35%, about 30%, about 25%, about 20%, about 15%, about 10%, about 5% by weight of the copolymer.

PHB4HB is a Type 2 PHB copolymer where the 4HB content is in the range of about 20% to about 60% by weight of the copolymer and preferably in the range of about 25% to about 50% by weight of the copolymer for example: about 25% 4HB; about 30% 4HB; about 35% 4HB; about 40% 4HB; about 45% 4HB; about 50% 4HB by weight of the copolymer.

PHB5HV is a Type 2 PHB copolymer where the 5HV content is in the range of about 20% to about 60% by weight of the copolymer and preferably in the range of about 25% to about 50% by weight of the copolymer for example: about 25% 5HV; about 30% 5HV; about 35% 5HV; about 40% 5HV; about 45% 5HV; about 50% 5HV by weight of the copolymer.

PHB3HH is a Type 2 PHB copolymer where the 3HH is in the range of about 35% to about 95% by weight of the copolymer and preferably in the range of about 40% to about 80% by weight of the copolymer, for example: about 40% 3HH; about 45% 3HH; about 50% 3HH; about 55% 3HH, about 60% 3HH; about 65% 3HH; about 70% 3HH; about 75% 3HH; about 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of about 30% to about 95% by weight of the copolymer and preferably in the range of about 35% to about 90% by weight of the copolymer, for example: about 35% 31-1×; about 40% 3HX; about 45% 3HX; about 50% 3HX; about 55% 3HX; about 60% 3HX; about 65% 3HX; about 70% 3HX; about 75% 3HX; about 80% 3HX; about 85% 3HX; about 90% 3HX by weight of the copolymer.

PHAs for use in the methods and compositions described in this invention are selected from: PHB or a Type 1 PHB copolymer; a PHA blend of PHB with a Type 1 PHB copolymer where the PHB content by weight of PHA in the PHA blend is in the range of about 5% to about 95% by weight of the PHA in the PHA blend; a PHA blend of PHB with a Type 2 PHB copolymer where the PHB content by weight of the PHA in the PHA blend is in the range of about 5% to about 95% by weight of the PHA in the PHA blend; a PHA blend of a Type 1 PHB copolymer with a different Type 1 PHB copolymer and where the content of the first Type 1 PHB copolymer is in the range of about 5% to 9 about 5% by weight of the PHA in the PHA blend; a PHA blend of a Type 1 PHB copolymer with a Type 2 PHA copolymer where the content of the Type 1 PHB copolymer is in the range of about 30% to 95% by weight of the PHA in the PHA blend; a PHA blend of PHB with a Type 1 PHB copolymer and a Type 2 PHB copolymer where the PHB content is in the range of about 10% to about 90% by weight of the PHA in the PHA blend, where the Type 1 PHB copolymer content is in the range of about 5% to about 90% by weight of the PHA in the PHA blend and where the Type 2 PHB copolymer content is in the range of about 5% to about 90% by weight of the PHA in the PHA blend.

The PHA blend of PHB with a Type 1 PHB copolymer is a blend of PHB with PHB3HP where the PHB content in the PHA blend is in the range of about 5% to about 90% by weight of the PHA in the PHA blend and the 3HP content in the PHB3HP is in the range of about 7% to about 15% by weight of the PHB3HP.

The PHA blend of PHB with a Type 1 PHB copolymer is a blend of PHB with PHB3HV where the PHB content of the PHA blend is in the range of about 5% to about 90% by weight of the PHA in the PHA blend and the 3HV content in the PHB3HV is in the range of about 4% to about 22% by weight of the PHB3HV.

The PHA blend of PHB with a Type 1 PHB copolymer is a blend of PHB with PHB4HB where the PHB content of the PHA blend is in the range of about 5% to about 90% by weight of the PHA in the PHA blend and the 4HB content in the PHB4HB is in the range of about 4% to about 15% by weight of the PHB4HB.

The PHA blend of PHB with a Type 1 PHB copolymer is a blend of PHB with PHB4HV where the PHB content of the PHA blend is in the range of about 5% to about 90% by weight of the PHA in the PHA blend and the 4HV content in the PHB4HV is in the range of about 4% to about 15% by weight of the PHB4HV.

The PHA blend of PHB with a Type 1 PHB copolymer is a blend of PHB with PHB5HV where the PHB content of the PHA blend is in the range of about 5% to about 90% by weight of the PHA in the PHA blend and the 5HV content in the PHB5HV is in the range of about 4% to about 15% by weight of the PHB5HV.

The PHA blend of PHB with a Type 1 PHB copolymer is a blend of PHB with PHB3HH where the PHB content of the PHA blend is in the range of about 5% to about 90% by weight of the PHA in the PHA blend and the 3HH content in the PHB3HH is in the range of about 4% to about 15% by weight of the PHB3HH.

The PHA blend of PHB with a Type 1 PHB copolymer is a blend of PHB with PHB3HX where the PHB content of the PHA blend is in the range of about 5% to about 90% by weight of the PHA in the PHA blend and the 3HX content in the PHB3HX is in the range of about 4% to about 15% by weight of the PHB3HX.

The PHA blend is a blend of a Type 1 PHB copolymer selected from the group PHB3HV, PHB3HP, PHB4HB, PHBV, PHV4HV, PHB5HV, PHB3HH and PHB3HX with a second Type 1 PHB copolymer which is different from the first Type 1 PHB copolymer and is selected from the group PHB3HV, PHB3HP, PHB4HB, PHBV, PHV4HV, PHB5HV, PHB3HH and PHB3HX where the content of the First Type 1 PHB copolymer in the PHA blend is in the range of about 10% to about 90% by weight of the total PHA in the blend.

The PHA blend of PHB with a Type 2 PHB copolymer is a blend of PHB with PHB4HB where the PHB content in the PHA blend is in the range of about 30% to about 95% by weight of the PHA in the PHA blend and the 4HB content in the PHB4HB is in the range of about 20% to about 60% by weight of the PHB4HB.

The PHA blend of PHB with a Type 2 PHB copolymer is a blend of PHB with PHB5HV where the PHB content in the PHA blend is in the range of about 30% to about 95% by weight of the PHA in the PHA blend and the 5HV content in the PHB5HV is in the range of about 20% to about 60% by weight of the PHB5HV.

The PHA blend of PHB with a Type 2 PHB copolymer is a blend of PHB with PHB3HH where the PHB content in the PHA blend is in the range of about 35% to about 95% by weight of the PHA in the PHA blend and the 3HH content in the PHB3HH is in the range of about 35% to about 90% by weight of the PHB3HX.

The PHA blend of PHB with a Type 2 PHB copolymer is a blend of PHB with PHB3HX where the PHB content in the PHA blend is in the range of about 30% to about 95% by weight of the PHA in the PHA blend and the 3HX content in the PHB3HX is in the range of about 35% to about 90% by weight of the PHB3HX.

The PHA blend is a blend of PHB with a Type 1 PHB copolymer and a Type 2 PHB copolymer where the PHB content in the PHA blend is in the range of about 10% to about 90% by weight of the PHA in the PHA blend, the Type 1 PHB copolymer content of the PHA blend is in the range of about 5% to about 90% by weight of the PHA in the PHA blend and the Type 2 PHB copolymer content in the PHA blend is in the range of about 5% to about 90% by weight of the PHA in the PHA blend.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV.

The PHA blend is a blend as disclosed in U.S. Pat. No. 7,781,539, by Whitehouse, which is incorporated herein by reference in its entirety.

In certain embodiments, additional PHA blends are prepared by blending PHB with three or more PHA copolymers where each copolymer has an increasing weight fraction of a second PHA such as 4HB, 3HH, 5HV or 3HO. The entire blend is a single phase system with unique properties due to the fact that each copolymer in the series acts as a compatibilizer for the adjacent PHA compositions. These blends are particularly useful as materials in PHA latex's used in paint formulations.

Microbial systems for producing the PHB copolymer PHBV are disclosed in, e.g., U.S. Pat. No. 4,477,654 to Holmes, which is incorporated herein by reference in its entirety. U.S. Published Application No. US 2002/0164729 (also incorporated herein by reference in its entirety) by Skraly and Sholl describes useful systems for producing the PHB copolymer PHB4HB. Useful processes for producing the PHB copolymer PHB3HH have been described (Lee et al., 2000, *Biotechnology and Bioengineering* 67:240-244; Park et al., 2001, *Biomacromolecules* 2:248-254). Processes for producing the PHB copolymers PHB3HX have been described by Matsusaki et al. (*Biomacromolecules* 2000, 1:17-22).

In determining the molecular weight techniques such as gel permeation chromatography (GPC) can be used. In the methodology, a polystyrene standard is utilized. The PHA can have a polystyrene equivalent weight average molecular weight (in daltons) of at least about 500, at least about 10,000, or at least about 50,000 and/or less than about 2,000,000, less than about 1,000,000, less than about 1,500,000, less than about 800,000, and less than about 600,000. In certain embodiments, preferably, the PHAs generally have a weight-average molecular weight in the range of 100,000 to 800,000, for example between about 400,000 and 800,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

In certain embodiments, the PHA can have a linear equivalent weight average molecular weight of from about 150,000 Daltons to about 500,000 Daltons and a polydispersity index of from about 2.5 to about 8.0. As used herein, weight average molecular weight and linear equivalent weight average molecular weight are determined by gel permeation chromatography, using, e.g., chloroform as both the eluent and diluent for the PHA samples. Calibration curves for determining molecular weights are generated using linear polystyrenes as molecular weight standards and a 'log MW vs elution volume' calibration method.

Non-PHA Polymers

Other biodegradable, non-PHA polymers can also be melt blended with the PHA to form a latex emulsion in any of the aspects or embodiments of the methods described herein. The other biodegradable polymers include but is not limited to polycaprolactone having a molecular weight from about 1000 to 1,000,000 Daltons; aliphatic polyesters derived from reaction of a diol and diacid comprising at least one diol selected from butane diol, ethylene glycol, polyethylene glycol, 1,2-hexane diol, 1,2-propylene glycol, 1,3-propylene glycol and at least one diacid selected from adipic acid, succinic acid, terephthalic acid or furan dicarboxylic acid. The latter materials include polymers such as polybutylene succinate, polybutylene-succinate-adipate and polybutylene-adipate-terephthalate. The weight percent of the non-PHA polymer in the latex is ≤20% based on the total weight of the PHA component.

Plasticizers

In any of the aspects or embodiments of the methods described herein, the PHA blend for use in the methods and compositions described herein further includes one or more liquid or solid plasticizers added during stage 1 of the PHA latex process. The addition of plasticizers helps to lower the viscosity of the PHA aiding in the melt mixing of the surfactant dispersion with the PHA and is added in an amount of 1-10% by weight of the total PHA component. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other.

Colloid Stabilizer System

In any of the aspects or embodiments of the methods described herein, the compositions and methods of the invention include a colloid stabilizer system of one or more components including surfactants and dispersants, such as water soluble polymeric dispersants (e.g., having one or more free carboxylic acid side chains).

Surfactants are generally used to reduce the surface tension in order to facilitate the formation and stabilization of the PHA emulsions (first water-in-PHA then PHA-in-water). A dispersant or a dispersing agent is either a non-surface active polymer or a surface-active substance added to a colloid suspension (up to 5% by weight PHA component) to improve the separation of particles and to prevent settling or clumping. Examples of surfactants include but are not limited to ionic types such as aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate. Particularly preferred is methylenesuccininc acid as a surfactant. For ionic dispersants, a final pH adjustment of the latex to bring it back to neutral may be needed. In this case, amine-type compounds are preferred.

Nonionic surfactants types for use in the methods and compositions described herein include fatty alcohols e.g., (cetyl, stearyl, oleyl), 3-hydroxybutyric acid (3HB) hydroxylated amine compounds (such as 3HB diethanolamide where the 3HB diethanolamide is nonreactive and solvent extracted from the aqueous PHA emulsion (latex) once it is formed), ethoxylated oligomers of 3-hydroxybutyrate, polyoxyethylene glycol alkyl ethers, polypropylene glycol alkyl ethers, lecithin and their ethylene oxide adducts, polyoxyethylene glycol octylphenol ethers and other alkyl ethers, polyoxyethylene glycol sorbitan alkyl esters (polysorbates), sorbitan alkyl esters (Span surfactants), glucosides (decyl, lauryl or octyl), glycerol alkyl esters and block copolymers of polyethylene. With nonionic surfactants, one needs to be cognizant of their HLB value (hydrophilic-lipophilic balance) relative to their function in the aqueous PHA emulsion (latex). Griffin's equation (1954) for calculating HLB values for nonionic surfactants is given as follows:

$$HLB=20*M_h/M$$

where $M_h$ is the molecular mass of the hydrophilic portion of the surfactant molecule, and M is the molecular mass of the whole molecule. The equation generates a value for each nonionic surfactant structure based on a scale of about 0 to about 20. An HLB value of about 0 corresponds to a completely hydrophobic molecule while a value of about 20 would correspond to a molecule made up completely of hydrophilic components. In this way, the HLB value is used to predict the surfactant behavoir of the molecule. Nonionic surfactant with HLB values from about 7 to about 11 are most appropriate for forming water-in-PHA emulsions and therefore would be utilized in stage 2 of the aqueous PHA emulsion (latex) process, whereas nonionic surfactants with an HLB value from about 12 to about 16 are most appropriate for forming PHA-in-water emulsions and, therefore, would be utilized in stage 3 of the aqueous PHA emulsion (latex) process. However, one needs to be careful of nonionic surfactants with HLB values much over about 12 because of their propensity to precipitate out of aqueous solutions in the temperature range of about 70° C. to about 100° C. Any surfactants utilized for producing PHA emulsions should be chosen such that their surface activity and solubility are maintained at the elevated temperatures required by the process while forming the PHA emulsion. Moreover, any surfactant should be chosen to be compatible with the intended end use; for example, for most film-forming applications it is desirable to avoid introducing any mineral residues, which would increase the water sensitivity of the film.

In certain embodiments, the compositions and methods of the invention include the addition of one or more polymeric dispersants added at 10-30% by weight of the PHA component. Examples of polymeric dispersants useful in the methods and compositions described herein include, among others: emulsions of polyvinyl acetate, partially hydrolyzed polyvinyl acetate, polyvinyl alcohol, saponified polyvinylalcohol, functionalized polyvinyl alcohols or combinations of these. Polyvinyl alcohol solutions or blends of polyvinyl alcohol (PVOH) in water should have viscosities in the range of 2-8 Pas preferably from 3 to 4.5 Pas @70° C. and a % solids content of 5-35% by weight. The polyvinyl alcohol can have a degree of hydrolysis from 30-98% and a degree of polymerization from about 150 to 2200. The PVOH solution can be combined with polyethyelene glycol or polyethylene oxide up to 20% by weight PVOH, anionic surfactants such as fatty acid soaps of sodium or potassium at 0.05% to 3% by weight of PVOH or a nonionic surfactant having an HLB value from 2 to 10 at 0.05% to 3% by weight PVOH.

It also could include polyacrylamides, polyvinyl pyrrolidones, polyacrylic acid, polymethacrylates, hydroxyethylacrylates, polyethylene imine, biodegradable polyesters modified with maleic, succinic or polyethylene oxide. Biodegradable and biobased dispersants such as PHA's grafted with maleic anhydride, starch, gelatin, hydroxyethyl cellulose and casein are included.

Emulsification Additives

In the methods described herein, the method optionally includes in certain embodiments, emulsification additives added to the PHA prior to melt mixing. Polymers which are partially or fully miscible with PHA are melt blended with the PHA to modify the emulsification process and the final film forming properties of the aqueous PHA emulsion. For example, polyvinyl acetate is known to be fully miscible with PHAs and hence forms a single phase system. Polyvinyl acetate has a $T_g$ of 44° C. which is much higher than that of poly-3-hydroxybutyrate (PHB) or its copolymers ($T_g$–~40 to about 7° C.), and therefore when added to PHA raises the glass transition temperature of the PHA blend. Emulsifiction additives, like PVA improve the ductility of the PHA blend by slowing the subsequent recrystallization of the PHA (e.g., 3HB) segments. If combined with the PHA in stage 1 (as described in the examples) of the aqueous PHA emulsion (latex) process, it inhibits PHB recrystallization and hence allows lower melt processing temperatures without polymer "freeze-off". Since the majority of polyvinyl acetate emulsions are produced using polyvinyl alcohol as the colloid stabilizer and are readily spray dried for other commercial uses, the spray dried polyvinyl acertate/polyvinyl alcohol solid polymer blend can also be introduced during the melt process step to control melt crystallization and also to impart some colloid stabilization component for the subsequent emulsification steps. After the latex is formed and applied for instance onto a substrate, if the PHA does recrystallize during drying of the coating, the PVA can act as a stabilizer to hold the PHA in place until the coating can be heated up to near its melting temperature in order to form a coherent coating.

Further, the polyvinyl acetate emulsion stabilized with polyvinyl alcohol can also be added as a partial or complete component in one of the aqueous additions steps.

In certain embodiments, the vinyl acetate polymer is a vinyl acetate homopolymer. In other embodiments, the vinyl acetate copolymer includes a polyvinyl acetate copolymer having from about 99 to about 84 percent by weight vinyl acetate and from about 1 to about 16 percent by weight percent ethylene and acrylate co monomers. The polyvinyl acetate polymer is produced by emulsion polymerization.

The amount of PVA added to the latex is about 1-40% by weight of the PHA component.

The polyvinylacetate can further include up to about 15 percent by weight of a polyvinyl alcohol having from about 60 to about 99.8 percent by weight degree of hydrolysis. The polyvinyl alcohol can include from about 1 to 99 percent by weight of a polyvinyl acetate homopolymer and from about 99 to about 1 percent by weight of a vinyl acetate copolymer or copolymer blend. The polyvinyl alcohol can have a molecular weight from about 10,000 Daltons to about 1,000,000 Daltons. The polyvinyl alcohol component can be cold water soluble or hot water soluble.

Commercially available polyvinyl acetate polymers emulsions include VINNIPAS® from Wacker Chemie AG. Commercially available polyvinyl alcohol or polyvinyl acetate emulsions include POVAL® from Kuraray America Inc. Other suppliers of PVOH or PVAc polymers include Nippon Gohsei, Unitika, Celanese and TexChem.

Other Additives

Also in the embodiments of the invention post aqueous PHA emulsion (latex) addition of additives and fillers is contemplated. The additive can be any compound known to those of skill in the art to be useful in the production of polymeric coatings, adhesives, primer, films or binders. Exemplary additives include, for example, antioxidants (e.g., to protect the polymeric composition from degradation by ozone or oxygen), ultraviolet stabilizers (e.g., to protect against weathering), lubricants (e.g., to reduce friction), pigments (e.g., to add color to the polymeric composition), flame retardants, fillers, antistatic agents, reinforcing agents (nanoclays), and/or mold release agents. Optimal amounts to be added will depend on various factors known to skilled practitioners, e.g., cost, desired physical characteristics of the polymeric composition (e.g., mechanical strength), and the type of processing to being performed (raising, e.g., considerations of line speeds, cycle times, and other processing parameters). It is well within the skilled practitioner's abilities to determine whether an additive should be included in a polymeric composition and, if so, what additive and the amount that should be added to the composition.

For instance, the compositions of the present invention may further comprise other additives such as about 0.1 to about 5 weight percent process lubricants and heat stabilizers; about 3 to about 40 weight percent fillers; about 5 weight percent to about 40 weight percent reinforcing agents; about 0.5 weight percent to about 10 weight percent nanocomposite reinforcing agents; and/or about 1 to about 40 weight percent flame retardants. Examples of suitable fillers include glass fibers and minerals such as precipitated calcium carbonate, ground calcium carbonate, talc, wollastonite, alumina trihydrate, wood flour, ground walnut shells, coconut shells and rice husk shells.

Fillers ordinarily are used to reduce cost and gloss of coatings. Antioxidants are used to prevent aging and embrittlement of the polymer. Impact modifiers are useful in rigid polymers to increase toughness. Pigments and colorants can be organic, or can be minerals such as titanium dioxide, and can be opacifying pigments, or tinting pigments. Fillers are chosen so that they are not detrimental to the latex properties.

Clays are also useful as additives, for instance, nanoclay or organically modified clay can be added to a polymeric composition. There are several types of clays used in polymeric compositions, including cationic or medium or high cation exchange capacity. The cation exchange capacity is generally reported as the number of milliequivalents of exchangeable base which is exchanged per 100 grams of clay. The cation exchange capacity varies from about 50 to about 150 depending on the type of clay. Examples of clays which can be organically modified include sepiolite, attapulgite, montmorillonites, bentonites, saponite and nentronite.

Applications for PHA Latex

Typical applications of PHA latex include as paints, adhesives (pressure sensitive, heat seal, wet), surface primers o laminating andesives for melt coating of PLA onto paper, binders for metal and ceramic powders, coatings for metals and ceramics for PIM applications, coatings for plants, seeds (hydroseeding), fertilizer, soil (stabilizer) and barrier coatings.

Methods

PHA Particle Size: Aqueous PHA emulsion (latex) particle size and distribution can be measured by dynamic light scattering using a Horiba Partica LA950 analyzer. The aqueous PHA emulsion (latex) sample is diluted 1 to 1000 into a solution of distilled water containing 0.1% potassium oleate as a surfactant (18% potassium oleate in water, VWR) and ultrasonicated for 10 seconds prior to measurement. The particle size results are reported as the D50 value which is the average equivalent diameter where 50% by mass of the particles have a larger or smaller equivalent diameter. The D50 values are calculated from the volume distribution.

Alternatively, the latex particle size can be measured using a Nicomp 370 Particle Sizing System. This method also uses dynamic light scattering to determine the latex particle size and distribution. For the analsyis, latex samples are diluted until the light scattering intensity on the Nicomp reads approximately 300 KHz. Samples are then held at a temperature of 23° C. for 5 minutes and analyzed for 15 minutes. The data provided by the instrument is mean particle diameter and distribution.

Analysis of PHA Molecular Weight by Flow Injection Polymer Analysis: The weight average molecular weight ($M_w$) of the PHA's was measured using Flow Injection Polymer Analysis (FIPA). This is a light scattering technique that measures only the weight average molecular of the polymer in solution. A Viscotek GPCMax VE 2001 with a TDA 302 detector was used to carry out the analysis using tetrahydrofuran as the mobile phase solvent set at 1 ml/min flow rate. A Viscotek FIPA column (I-MBLMW-3078) was used for the chromatographic separation of the PHA's. Both column and detectors were maintained at a temperature of 45° C. during the analysis. Samples for analysis were prepared by first dissolving the PHA in chloroform at 60° C. (2 mg/ml), cooling the solution to room temperature and then filtering the solutions through a 0.2 μm filter. Each sample was then injected into the Visctoek GPCMax at an injection volume of 100 μl. The $M_w$ of the PHA samples were then determined using the Viscotek Omnisec 4.0 analysis software.

PHA Crystallinity: PHA percent crystallinity was measured using FTIR by the method of Bloembergen et al. (Macromolecules 1986, 19, 2865-2870). A Bruker Tensor 27 with ATR Pike attachment was used to collect the FTIR spectra. The spectra was collected using a resolution of 4 cm-1 with a scan range of 4000-600 $cm^{-1}$ wavenumbers. Each spectra collected was the average of 32 scans. Amorphous PHA particles showed characteristic IR bands at 1185 and 1303 cm-1, while crystalline PHA particles showed characteristic bands at 1228, 1280, and 1288 cm-1. Percent crystallinity of the PHA particle in the aqueous PHA emulsion (latex) was estimated from the ratio of the crystalline to amorphous IR bands measured for PHA standards having known percent crystallinity as determined by Differential Scanning calorimetry (DSC). Alternatively, DSC could be used as the primary technique for measuring the % crystallinity. A film of the aqueous PHA emulsion (latex) is prepared and dried at 105° C. in a vacuum oven. Using a Q100 DSC (TA Instruments), 8-10 mg of the dried aqueous PHA emulsion (latex) film is load into an aluminum pan and sealed with an aluminum lid. The aluminum pan+sample is then placed into the DSC sample cell and the instrument programmed to heat, cool then heat at 10° C./min from 25 to 200° C. The final % crystallinity is then determined by integrating the area under the melting peak from the second heating curve to give the heat of melting in joules per gram of sample. This value is then divided by the theoretical heat of melting and multiplied by 100% to give the % crystallinity.

Viscosity Measurement of Polymer Melts and Aqueous Solutions: Viscosity is a property of liquids which can be defined as the resistance to flow. Liquids that flow past a surface or have objects that move through them (under gravity for example) all exhibit drag between the liquid and the solid surface. This drag is due to the frictional forces in the liquid also known as the viscosity. It is measured by a number of different instruments giving various values of the viscosity (dynamic, kinematic etc.). For liquids with viscosities which vary with flow conditions, an instrument called a rheometer is used while for most other liquids, viscometers are used which measure viscosity under only one flow condition. Polymer melts fall into the category of having viscosities which change with flow conditions or are shear rate dependent. Instruments which measure polymer melt viscosities include rotational and capillary rheometers. These types of instruments heat a polymer up to its melt temperature then apply a stress to the polymer melt. The force required to make the polymer flow is measured as a function of shear rate. In the case of the rotational rheometers, the polymer is placed between two spherical plates. One of the plates is then rotated at a certain speed relative to the other plate and the force measured. The ratio of the force to the shear rate is the viscosity. For capillary rheometers, the polymer is loaded into a barrel, melted, then push out of the barrel and through a die using a plunger moving at a certain velocity. The force required to push the polymer out of the barrel is measured. The ratio of the force to the plunger speed leads to a measurement of the polymer melt viscosity. For aqueous-based liquids, viscometers are typically used to measure the kinematic viscosity. The kinematic viscosity is the dynamic viscosity (measured using a single shear rate) divided by the density of the liquid. Viscometers used for measuring kinematic viscosity include glass capillary-type like the Ubbelohde where the time required for the test liquid to flow through a capillary of a known diameter of a certain factor between two marked points is measured. By multiplying the time taken by the factor of the viscometer, the kinematic viscosity is obtained. Other types of viscometers include bubble-type, or falling ball-type and falling piston-type. Each measures the time for a body (bubble or solid mass) to rise or fall through a liquid. The time is then proportional to the kinematic viscosity. Rotational rheometers such as the cup and bob-type (Brookfield viscometer) can also be used where the force required to rotate a cup or bob in a fluid is measured at a fixed shear rate. The force is then proportional to the kinematic viscosity.

PHA Materials: The identification and composition of the polyhydroxyalkanoate (PHA) materials used for producing the PHA latex samples were as follows:

PHA A: Poly-(3-hydroxybutyrate-co-8-14%-4-hydroxybutyrate) copolymer.
$M_w$~350,000

PHA B: Blend of 18-22% P3HB and 78-82% P3HB-4HB copolymer with 8-14% 4HB by weight.
$M_w$~385,000

PHA C: Blend of 34-38% P3HB, 22-26% P3HB-4HB copolymer with 8-14% 4HB by weight and 38-42% P3HB-4HB copolymer with 25-33% 4HB by weight.
$M_w$~379,000

PHA D: Poly-(3-hydroxybutyrate-co-8-14%-4-hydroxybutyrate) copolymer.
$M_w$~658,000

All of the PHA's listed above were produced by genetically engineered microorganisms and solvent extracted to obtain the pure polymer prior to processing into PHA latex samples.

EXAMPLE 1

Aqueous PHA Latex Prepared from PHA Copolymer

A PHA A containing biomass is produced in a 20 L New Brunswick Scientific fermentor (BioFlo 4500) using a genetically modified E. coli strain specifically designed for production of this polyhydroxybutyrate copolymer from glucose syrup as a carbon feed source. Examples of the E. coli strains, fermentation media and feed conditions are described in U.S. Pat. Nos. 6,316,262; 6,689,589; 7,081,357; and 7,229,804. The E. coli strain generates a fermentation broth which can have a PHA titer of approximately 120 g of PHA/kg of broth. The 11% poly-4HB is extracted from the biomass using cyclohexanone and then precipitated with heptane. The mixture after centrifuging twice is washed with water and filtered. The wet 11% poly-4HB is then dried in an oven at 110° C. overnight.

After drying to constant weight, the PHA A is introduced into a co-rotating, 27 mm Leistritz twin screw extruder (TSE) running at 250 rpm at rate of 40 lbs/hr with a first stage heating set at about 160° C. For the PHA A, the melting temperature is approximately 140° C. In the second stage, the heating temperature is lowered to about 120° C. and a solution of about 20% of a partially-saponified polyvinyl alcohol (POVAL® 220EG, Kuraray Co.), previously heated to about 80° C. is injected using a piston pump into the extruder at rate of 10 lbs/hr. The PHA is continuously melt extruded while the PVA is added. As the PVA solution is shear mixed with the molten PHA, a water-in-PHA emulsion is formed. In this zone, high shear mixing elements on the screw are used for dispersing the water into the molten PHA. In the third stage, water, heated to about 65° C., is continually added at a rate of about 35 lb/hr to the aqueous PHA emulsion into a second port along the extruder where the high viscosity phase inversion occurs to form the PHA latex-in-water, an aqueous PHA emulsion (latex). The aqueous PHA emulsion (latex) formed is cooled as it exits the intense mixing sections of the extruder exiting at about 40° C. to about 70° C. (e.g., at 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C.). In some embodiment, the cooling is done gradually at room temperature.

The particle size of the aqueous PHA emulsion (latex) would have a $D_{50}$ value of about 0.7 µm with crystallinity in the range of about 1% or less. The % solids measured by drying a known weight of latex solution, is found to be about 45±5% by weight. The aqueous PHA emulsion (latex) solution is applied to a paper substrate to form a strong coherent film when dried at about 90° C. The dry PHA film thickness is about 7-8 µm thick and pinhole free.

EXAMPLE 2

Aqueous PHA Latex Prepared from a PHA Blend

Poly(3-hydroxybutyrate) (poly-3HB) containing biomass is produced in a 20 L New Brunswick Scientific fermentor (BioFlo 4500) using a genetically modified *E. coli* strain specifically designed for production of poly(3-hydroxybutyrate) from glucose syrup. Examples of the *E. coli* strains, fermentation media and feed conditions are described in U.S. Pat. Nos. 6,316,262; 6,689,589; 7,081,357; and 7,229,804. The *E. coli* strain generates a fermentation broth which has a PHA titer of approximately 120 g of PHA/kg of broth. The poly-3HB is extracted from the biomass using cyclohexanone and then precipitated with heptane. The mixture is then centrifuged twice, washed with water and filtered. The wet poly-3HB is then dried in an oven at about 110° C. overnight.

The poly-3HB is preblended with the PHA A described in Example 1 at a weight % poly-3HB of 30-70%, or directly added as individual components to the feed throat of the extruder at the correct ratio. The pellets are processed on a 16 mm twin screw counter-rotating Prism Twin Screw Extruder (TSE), under the following processing conditions (feed zone to die): about 170° C./about 171° C./about 173° C./about 175° C./about 175° C./about 177° C./about 177° C./about 177° C./about 177° C./about 177° C. at a screw speed of about 250 rpm, extruded into a water bath held at about 50° C. and pelletized. The pellets are then fed to a 27 mm Leistriz TSE and processed according to the conditions described in Example 1 using POVAL® 220EG as the dispersing agent. Alternatively, the poly-3HB and PHA A are melt blended together in the Leistriz 27 mm TSE prior to emulsification at a temperature of about 170° C. The aqueous PHA emulsion (latex) is extruded out and can have a $D_{50}$ particle size of <1-1.5 µm and crystallinity<about 1%.

EXAMPLE 3

Aqueous Latex Prepared from PHA Copolymer Blended with Poly-butylene Succinate (PBS), Polybutylene Succinate Adipate (PBSA) and Poly-butylene Adipate Terephathalate (PBAT)

PHA A polymer is prepared from genetically engineered microbial biomass as outlined in Example 1. The PHA A polymer is then melt blended, pelletized and emulsified with other biodegradable polyesters such as poly-butylene-succinate (BIONOLLE® 1001, Showa Highpolymer Co., Ltd., Japan), poly-butylene-succinate-adipate (BIONOLLE® 3001, Showa Highpolymer Co., Ltd., Japan), or poly-butylene-adipate-terephthalate (ECOFLEX®, BASF) using the same or similar processing conditions detailed in Example 1. Alternatively, PHA A is directly melt blended with the other biodegradable polyesters then emulsified. The aqueous PHA blend emulsion (latex) produced can have a median particle size of <1 µm ($D_{50}$<1 µm and $D_{90}$<3 µm) and crystallinity<1%.

EXAMPLE 4

Aqueous PHA Latex Prepared from with Additional Surfactants

PHA A polymer is prepared from a genetically engineered microbial biomass as outlined in Example 1. After drying to constant weight, the PHA A is introduced into a co-rotating, 27 mm Leistritz twin screw extruder (TSE) with a first stage heating set at 160° C. For the PHA A, the melting temperature is approximately 140° C. In the second stage, the heating temperature is lowered to about 120° C. and a polymer dispersant solution, previously heated to about 80° C. under agitation, is injected using a plunger pump into the extruder. The types of polymer dispersions that can be added include POVAL® S-2217 (a modified PVA with 2-acrylamido-2-methyl propoane sulfonic acid groups), POVAL® 117 (100% saponified polyvinyl acetate) or POVAL® 124 (a polyvinylacetate emulsion having superior film strength) all available from Kuraray Co. The PHA is continuously melt extruded while the polymer dispersant is added. As the PVA emulsion is shear mixed with the molten PHA, the viscosity can generally increase to a maximum value of about 20,000 mPa·s producing a water-in-PHA emulsion. In stage 3, water with additional surfactants added such as Hypermer CG6 (an acrylic graft copolymer available from ICI), heated to about 65° C., is continually added to the PHA+PVA emulsion into a second port along the extruder until there is a phase inversion which significantly lowers the viscosity of the mixture. An aqueous PHA emulsion (latex) is then formed exiting out the end of the extruder. The particle size of the aqueous PHA emulsion (latex) would have a $D_{50}$ value of about 0.7 µm with a crystallinity in the range of about 1% or less. The % solids measured by drying a known weight of aqueous PHA emulsion (latex) solution, are found to be about 45±5% by weight.

EXAMPLE 5

Aqueous PHA Latex Prepared for Paint Applications

PHA A powder is prepared, recovered and then made into an aqueous PHA emulsion (latex) as outlined in Example 1. In addition to the PHA A, other additives specific for latex paints can be added post emulsification. These include pigments either inorganic (carbon black, titanium dioxide, silicates, calcium carbonate, iron oxide, chrome oxides, or clays) or organic (azo dyes, phthalo greens, quinacridone etc.), foam control additives, texturizers, UV stabilizers, plasticizers, flatteners and biocides. The aqueous PHA emulsion (latex) produced can have PHA particles with a median size of 0.7 µm and <1% crystallinity. Since no solvents are used in the production of the aqueous PHA emulsion (latex) paint, there are no VOC components present. When the aqueous PHA emulsion (latex) paint is coated and dried on to a wood surface, the paint coating shows good material properties, for example, adhesion, gloss, porosity and abrasion resistance.

EXAMPLE 6

Aqueous PHA Latex Prepared with Polyvinyl Acetate for Paper Bonding Applications PHA A is prepared as outlined in Example 1. After drying to constant weight, the PHA A is introduced into a co-rotating, 27 mm Leistritz twin screw extruder (TSE) running at 250 rpm at rate of 30 lbs/hr and a side pellet feed of Vinnapas B60 a polyvinyl acetate resin at 10 lb/hr with a first stage heating set at 160° C. For the PHA A, the melting temperature is approximately 140° C. In the second stage, the heating temperature is lowered to about 120° C. and a solution of about 20% of a partially-saponified polyvinyl alcohol (POVAL® 220EG, Kuraray Co.), previously heated to about 80° C. is injected using a piston pump into the extruder at rate of 10 lbs/hr. The PHA A is continuously melt extruded while the PVA is added. As the PVA solution is mixed with the molten PHA, a water-in-PHA emulsion is formed. The mixing can be accomplished either by high shear or high distributive mixing screws in the extruder. In stage 3, water, heated to about 65° C., is continually added at a rate of about 35 lb/hr to the water-in-PHA emulsion into a second port along the extruder where the high viscosity phase inversion occurs to form the PHA-in-water, aqueous PHA emulsion (latex). The aqueous PHA emulsion (latex) formed is cooled as it exits the intense mixing sections of the extruder exiting at 40-70° C. The particle size of the aqueous PHA emulsion (latex) would have a $D_{50}$ value of 0.7 µm with a crystallinity in the range of 1% or less. The % solids measured by drying a known weight of latex solution, are found to be 45±5% by weight. The aqueous PHA emulsion (latex) was applied as an adhesive layer to two paper substrates and allow to dry for 1 hour; removal of the aqueous PHA emulsion (latex) layer showed visibly deep paper tears indicating that this could be used as a laminating adhesive in corrugated board construction.

EXAMPLE 7

Aqueous PHA Latex Prepared with a PVA Emulsion Blend

PHA is prepared as outlined in Example 1. After drying to constant weight, the PHA A is introduced into a co-rotating, 27 mm Leistritz twin screw extruder (TSE) running at 250 rpm at rate of 40 lbs/hr with a first stage heating set at 160° C. For the PHA A, the melting temperature is approximately 140° C. In the second stage, the heating temperature is lowered to about 120° C. A dispersion of about 50% Vinnapas H65 (65% polyvinyl acetate in water produced by emulsion polymerization) and 50% of a solution of 20% of a partially-saponified polyvinyl alcohol (POVAL® 220EG, Kuraray Co.), previously premixed at room temperature and directly injected at about 25° C. injected using a piston pump into the extruder at rate of 20 lbs/hr. The polyvinyl acetate and polyvinyl alcohol aqueous premix is shear mixed with the molten PHA, a water-in-PHA emulsion is formed. In this zone, high shear mixing elements on the screw are necessary in order to disperse the water into the molten PHA. In stage 3, water, heated to about 65° C., is continually added at a rate of 25 lb/hr to the water in PHA emulsion into a second port along the extruder where the high viscosity phase inversion occurs to form the PHA-in-water, aqueous PHA emulsion (latex). The aqueous PHA emulsion (latex) formed is cooled as it exits the intense mixing sections of the extruder exiting at about 40° C. to about 70° C. The aqueous PHA emulsion (latex) is applied to copy paper at 15 g/m² wet coating weight and allowed to dry. The dried paper is passed through an inkjet paper printer where high quality printed text definition was observed. The coated printed paper was readily repulpable so could be used in a paper recycling process whereas a typical styrene acrylate emulsion used for the same application could not be easily repulped; thus demonstrating the ability of the aqueous PHA emulsion (latex) to act as a paper primer for high quality graphics printing while being fully recyclable.

EXAMPLE 8

Extruder Screw Speeds Vs. PHA Latex Particle Size and Stability

In this example, the effects of extruder screw speed on PHA latex particle size and stability were investigated. PHA A was fed into a 26 mm, co-rotating twin screw extruder (Coperion TSE CX26, L/D=42) having a heated feed section, nine heated barrel zones and a distributive-type mixing screw. The TSE temperature profile during processing of the PHA latex from feed to outlet was as follows: 157° C./167° C./173° C./182° C./120° C./100° C./86° C./89° C./69° C./70° C. In the first stage of the process, the 11%-poly4HB was fed at 20 lbs/hr and melted at 157-182° C. In the second stage, a 33% polyvinyl alcohol surfactant solution (POVAL® 403, 78-82% hydrolyzed, Kuraray Co.) maintained at room temperature was introduced into the extruder at the 120° C. heat zone and mixed with the molten PHA. Finally in the third stage, room temperature DI water was introduced to the PHA/surfactant mixture at the 120° C. heat zone. The temperature of the PHA latex mixture was then cooled to a final outlet temperature of 70° C.

Table 2 shows the PHA latex formulations, extruder processing conditions as well as the resulting particle size of the final PHA latex. The latex particle sizes (mean diameter) were measured using the Nicomp 370 Particle Sizing system as described previously.

TABLE 2

Summary of PHA latex formulations, processing conditions, stability and latex particle sizes versus extruder screw speed.

| Sample ID | A1 | A2 | A3 | A4 | A5 | A6 | A7 |
|---|---|---|---|---|---|---|---|
| PHA A* (lbs/hr) | 20 | 20 | 20 | 20 | 20 | 20 | 20 |
| 33% POVAL ® 403 (lbs/hr) | 8.1 | 8.1 | 8.1 | 8.1 | 8.1 | 8.1 | 8.1 |
| Water (lbs/hr) | 22.2 | 22.2 | 22.2 | 22.2 | 22.2 | 22.2 | 22.2 |
| Total Feed Rate (lbs/hr) | 50.3 | 50.3 | 50.3 | 50.3 | 50.3 | 50.3 | 50.3 |
| Calculated % Total Solids | 45.1 | 45.1 | 45.1 | 45.1 | 45.1 | 45.1 | 45.1 |
| Torque (%) | 18 | 18 | 18 | 18 | 18 | 18 | 18 |
| Screw Speed (rpm) | 200 | 400 | 500 | 600 | 800 | 1000 | 1100 |
| Mean Particle Diameter (µm) | >3 | >2.5 | 2.1 | 1.59 | 1.43 | 1.37 | 1.18 |
| Latex Visual Appearance/Stability | Large particles unstable dispersion | Large particles unstable dispersion | Some large particles | No large particles stable dispersion | Very stable dispersion | Very stable dispersion | Very stable dispersion |

*PHA A: Poly-(3-hydroxybutyrate-co-8-14%-4-hydroxybutyrate). $M_w$ ~350,000

The results in Table 2 show that at low screw speeds, the PHA A polymer did not get fully emulsified and a speed of at least 600 rpm was required to get a stable latex dispersion with an acceptable mean particle diameter of 2 microns or below. The dispersions produced with screw speeds of 600 rpm or greater showed good stability over 3 months at 20-25° C. with no detectable change in particle size on standing.

Application of the PHA latex by paint brush to paper and wood substrates provided a clear tough film when dried at 20° C. without the need for traditional coalescing solvents to providing additional film forming assistance.

The above data shows that the preferred speed for the 26 mm twin screw extruder was from 600 rpm to 1100 rpm with marginally smaller mean particle size at higher rpm; all being acceptable for a commercial PHA latex product.

EXAMPLE 9

Effect of Latex Production Rate, Surfactant/PHA Ratio and Percent Total Solids Content on PHA Latex Particle Size and Stability In this example, the effect of latex production rate, Solid Surfactant/PHA ratio and percent total solids on the stability and particle size of the PHA latex formed were investigated. PHA A was processed using the twin screw extruder and conditions as described in Example 8. However, the screw speed was maintained at a constant 600 rpm for each of the samples (B1-B15). The feed rates of the PHA, surfactant solution and water were varied in order to produce emulsions with different solids content, ratio of Solid Surfactant/PHA and productions rates. The latex particle sizes were measured using the Nicomp 370 Particle Sizing system as described previously. Table 3 summarizes the formulations, conditions used and the particle size results for each of the PHA latex samples produced. The data in Table 3 showed that the PHA latex production rates from 50 lbs/hr to 96 lbs/hr could be achieved at 600 rpm by adjusting the component feed rates. The data further showed that if the Solid Surfactant/PHA ratio fell to between 0.07 to 0.135, then acceptable particle size (diameter ~1.2 to 1.4 μm) and stable emulsions were achieved. At ratios beyond these boundaries, the particle size and stability of the PHA latex emulsions were less desirable. Again these emulsions showed good stability over a 3 month period at 20-25° C. with no change in particle size or dispersion. Application of the emulsion by paint brush to paper and wood provided a clear tough film at 20° C. without the need for traditional coalescing solvents to providing additional film forming assistance.

TABLE 3

Summary of PHA latex formulations, production rates, surfactant/PHA ratios and percent solids versus latex particle size.

| Sample ID | B1 | B2 | B3 | B4 | B5 | B6 | B7 | B8 |
|---|---|---|---|---|---|---|---|---|
| PHA A (lbs/hr) | 20 | 20 | 25 | 30 | 35 | 35 | 45 | 45 |
| 33% POVAL ® 403 (lbs/hr) | 10.6 | 8.1 | 8.1 | 8.1 | 9.1 | 9.6 | 10.1 | 10.6 |
| Water (lbs/hr) | 22.2 | 22.2 | 22.2 | 22.2 | 22.2 | 22.2 | 22.2 | 22.2 |
| Total Feed Rate (lbs/hr) | 52.8 | 50.3 | 55.3 | 60.3 | 66.3 | 66.8 | 77.3 | 77.8 |
| Calculated % Total Solids | 44.5 | 45.0 | 50 | 54.1 | 57.3 | 57.1 | 62.5 | 62.3 |
| Ratio of Solid Surfactant/PHA | 0.175 | 0.134 | 0.107 | 0.089 | 0.086 | 0.090 | 0.074 | 0.077 |
| Mean Particle Diameter (μm) | >2 | 1.43 | 1.24 | 1.196 | 1.30 | 1.21 | 1.29 | 1.31 |
| Latex Stability | P | G | G | G | G | G | G | G |

P = poor
G = good

| Sample ID | B9 | B10 | B11 | B12 | B13 | B14 | B15 |
|---|---|---|---|---|---|---|---|
| PHA A (lbs/hr) | 45 | 45 | 50 | 55 | 60 | 60 | 60 |
| 33% POVAL ® 403 (lbs/hr) | 15.0 | 8.0 | 11.0 | 11.5 | 12.0 | 13.0 | 13.9 |
| Water (lbs/hr) | 22.2 | 22.2 | 22.2 | 22.2 | 22.2 | 22.2 | 22.2 |
| Total Feed Rate (lbs/hr) | 82.2 | 75.2 | 83.2 | 88.7 | 94.2 | 95.2 | 96.1 |
| Calculated % Total Solids | 60.8 | 63.4 | 64.5 | 66.3 | 67.9 | 67.5 | 67.2 |
| Ratio of Solid Surfactant/PHA | 0.110 | 0.059 | 0.073 | 0.069 | 0.066 | 0.071 | 0.077 |
| Mean Particle Diameter (μm) | 1.33 | 2.60 | 1.45 | 1.43 | 1.70 | 1.43 | 3.03 |
| Latex Stability | G | G | G | G | Marginal | G | P |

P = poor
G = good

* PHA A: Poly-(3-hydroxybutyrate-co-8-14%-4-hydroxybutyrate). $M_w$ ~350,000

EXAMPLE 10

Effect of Reduced Surfactant Solids on PHA Latex Formation

In this example, the effect of using a reduced surfactant solids solution on the ability to form a PHA latex was investigated. The use of a lower solids content polyvinyl alcohol surfactant solution (30% POVAL® 403, Kuraray Co.) as compared to the solution used in Examples 8 and 9 (33% POVAL® 403) reduced the solution's viscosity from approximately 10,000 Pas to 6000 Pas (measured using a Brookfield viscometer) which had a significant impact on the emulsification process where the surfactant forms an aqueous solution within the molten PHA polymer matrix. PHA A was fed to a 26 mm, co-rotating twin screw extruder (Coperion TSE CX26, L/D=42) having a heated feed section, nine heated barrel zones and a distributive-type mixing screw. The TSE temperature profile during processing of the PHA latex from feed to outlet was as follows: 170° C./170° C./173° C./182° C./120° C./100° C./86° C./87° C./69° C./70° C. The screw speed was maintained at 600 rpm for all of the Samples except Sample C3 where the rpm was raised to 1000. As in Examples 8 and 9, the surfactant solution and water were maintained at room temperature until they were added sequentially to the extruder at the 120° C. heated zone.

Table 4 shows the PHA latex formulations, extruder processing conditions as well as the resulting particle size of the final PHA latex samples. The latex particle sizes (mean diameter) were measured using the NiComp 370 Particle Sizing system as described previously. As shown in Table 3, the highest latex production rate was achieved for Sample C8 at 143 lbs/hr which also had a very high surfactant solution feed rate. This high surfactant feed rate was sufficient to quench the temperature of the polymer during the surfactant addition and caused the formation of solid PHA particles which could not be emulsified and therefore did not form a latex. Sample C7 showed the other extreme in that at very low levels of surfactant, this was insufficient to cause the PHA to fully emulsify during the inversion process i.e. from a water-in-PHA to a PHA-in-water solution. In this case, the ratio of surfactant/PHA was approximately 0.05 and below the recommended surfactant/PHA values as determined in Example 9. The use of a lower surfactant solids solution to prepare the PHA latexes, appeared to lower the latex particle size overall when the ratio of surfactant/PHA was in the optimum range.

TABLE 4

Summary of PHA latex formulations, production rates, and surfactant/PHA ratio versus latex particle size.
The surfactant solution used was a 30% POVAL ® 403 (Kuraray Co.) having a viscosity of 6000 Pas.

| Sample ID | C1 | C2 | C3 | C4 | C5 | C6 | C7 | C8 | C9 | C10 | C11 | C12 |
|---|---|---|---|---|---|---|---|---|---|---|---|---|
| PHA A (lbs/hr) | 40 | 40 | 50 | 60 | 65 | 65 | 65 | 65 | 70 | 30 | 30 | 30 |
| 30% POVAL ® 403 (lbs/hr) | 10.7 | 10.7 | 15.0 | 15.0 | 15.6 | 16.8 | 10.8 | 30.0 | 16.8 | 16.8 | 12.5 | 12.5 |
| Water (lbs/hr) | 29.4 | 29.4 | 36.9 | 36.9 | 40.6 | 48.0 | 48.0 | 48.0 | 48.0 | 48.0 | 36.9 | 31.3 |
| Total Feed Rate (lbs/hr) | 80.1 | 80.1 | 101.9 | 111.9 | 121.2 | 129.9 | 123.8 | 143 | 134.8 | 94.8 | 79.4 | 73.8 |
| Ratio Solid Surfactant/PHA | 0.08 | 0.08 | 0.09 | 0.08 | 0.07 | 0.08 | 0.05 | 0.14 | 0.07 | 0.17 | 0.14 | 0.14 |
| % Surfactant Solids | 4.0 | 4.0 | 4.4 | 4.0 | 3.9 | 3.9 | 7.3 | 6.3 | 3.7 | 5.3 | 4.7 | 5.1 |
| Calculated % Total Solids | 53.9 | 53.9 | 53.5 | 57.6 | 57.5 | 53.9 | 55.1 | 51.7 | 55.7 | 37.0 | 42.5 | 45.7 |
| Torque (%) | 18 | 22 | 25 | 25 | 26 | 26 | 26 | 26 | 26 | 27 | 27 | 28 |
| Latex Stability/Appearance | Good | Good | Good | Good | Good | Good | Very grainy | Poor | Good | Good | Good | Good |
| Mean Particle Diameter (μm) | 1.29 | 1.25 | 1.46 | 1.89 | 1.74 | 1.91 | >2 | — | 1.76 | 1.48 | 1.44 | 1.56 |

* PHA A: Poly-(3-hydroxybutyrate-co-8-14%-4-hydroxybutyrate). $M_w$ ~350,000

EXAMPLE 11

Effect of PHA Composition on the Formation of PHA Latex

In this example, PHA's having different compositions were processed in order to evaluate whether they were capable of forming a PHA latex. PHA B, C and D were all processed using a 26 mm, co-rotating twin screw extruder (Coperion TSE CX26, L/D=42) having a heated feed section, nine heated barrel zones and a distributive-type mixing screw. The TSE temperature profiles during processing of the PHA compositions, the screw speeds and the feed rates for each of the D1-D12 latex samples produced are shown in Table 5 below. PHA A was also included as a control in this sample set. The polyvinyl alcohol surfactant solution utilized to produce the PHA latexes was the same as that described in Example 10 (30% POVAL® 403, Kuraray Co). Also shown in Table 5 are the PHA latex mean particle diameters as measured using the Nicomp 370 Particle Sizing system as described previously. The results in Table 5 showed that a wide range of PHA compositions could be utilized by the process to produce a PHA latex. It should be noted that PHA B and C were PHA blends that contained a certain percentage of PHA A in them. The blends also contained a certain percentage of poly-3-hydroxybutyrate (P3HB) which had a melting point of 174° C. and crystallinity of 65%. The barrel temperatures in the extruder were therefore raised as shown in Table 5 to ensure complete melting of the P3HB component in PHA blends B and C and to ensure the destruction of the P3HB crystallite memory during melt processing. Additionally, the extruder barrel temperatures were adjusted after complete melting of the PHA blends so that the temperature of the molten polymer when mixed with the surfactant solution was similar to those in Example 10. More energy for emulsification was required for the PHA blends as well as the higher molecular weight PHA D as evidenced by the lower latex output rates. However, the mean latex particle diameters were comparable with those produced in Example 10. Interestingly, PHA latex Sample D4 (PHA B) had a mean particle diameter of 1.47 μm at a surfactant/PHA ratio of 0.168 which was outside of the optimum range previously observed for PHA A in Example 9. This suggested that for the PHA blends, the processing window or conditions for making acceptable PHA latex dispersions may be wider than compared with the pure copolymer only.

with a 30% POVAL® 403 only (Sample E1) was also included as a control. All samples were processed using a 26 mm, co-rotating twin screw extruder (Coperion TSE CX26, L/D=42) having a heated feed section, nine heated barrel zones and a distributive-type mixing screw. The TSE temperature profile during processing of the PHA latexes from the heated feed section to the outlet was as follows: 157° C./167° C./173° C./182° C./120° C./100° C./86° C./87° C./69° C./70° C. The screw speed for all latex samples was set at 600 rpm. PHA latex mean particle diameters were measured using the Nicomp 370 Particle Sizing system as described previously. Table 6 summarizes the formulations and processing conditions for the latex samples produced (E1-E4).

TABLE 5

Summary of PHA latex formulations, production rates, and surfactant/PHA ratio versus latex particle size for various PHA compositions.

| Sample ID | D1 | D2 | D3 | D4 | D5 | D6 | D7 | D8 | D9 | D10 | D11 | D12 |
|---|---|---|---|---|---|---|---|---|---|---|---|---|
| PHA A (lbs/hr) | 40 | | | | | | | | | | | |
| PHA B (lbs/hr) | | 40 | 40 | 30 | | | | | | | | |
| PHA C (lbs/hr) | | | | | 30 | 30 | 30 | 30 | | | | |
| PHA D (lbs/hr) | | | | | | | | | | 30 | 30 | 20 | 20 |
| 30% POVAL ® 403 (lbs/hr) | 10.7 | 16.8 | 16.8 | 16.8 | 13.8 | 12.5 | 11.3 | 10.7 | 10.7 | 7.6 | 6.4 | 5.8 |
| Water (lbs/hr) | 29.4 | 31.3 | 36.9 | 31.3 | 29.4 | 29.4 | 25.7 | 25.7 | 25.7 | 25.7 | 18.3 | 16.4 |
| Total Feed Rate (lbs/hr) | 80.1 | 88.1 | 93.7 | 78.1 | 73.2 | 71.9 | 67.0 | 66.4 | 66.4 | 63.3 | 44.7 | 42.2 |
| Screw speed (rpm) | 600 | 800 | 1000 | 800 | 600 | 600 | 600 | 600 | 600 | 600 | 600 | 600 |
| Feed | 170 | 157 | 157 | 185 | 185 | 185 | 185 | 185 | 185 | 185 | 185 | 185 |
| zone 1 | 170 | 167 | 167 | 185 | 185 | 185 | 185 | 185 | 185 | 185 | 185 | 185 |
| zone 2 | 173 | 173 | 173 | 185 | 185 | 185 | 185 | 185 | 185 | 185 | 185 | 185 |
| zone 3 | 182 | 182 | 182 | 182 | 182 | 182 | 182 | 182 | 182 | 182 | 182 | 182 |
| zone 4 | 120 | 120 | 120 | 120 | 120 | 120 | 120 | 120 | 120 | 120 | 120 | 120 |
| zone 5 | 100 | 100 | 100 | 100 | 100 | 100 | 100 | 100 | 100 | 100 | 100 | 100 |
| zone 6 | 86 | 86 | 86 | 86 | 80 | 80 | 80 | 80 | 80 | 80 | 80 | 80 |
| zone 7 | 87 | 87 | 87 | 87 | 87 | 87 | 87 | 87 | 87 | 87 | 87 | 87 |
| zone 8 | 69 | 69 | 69 | 69 | 69 | 69 | 69 | 69 | 69 | 69 | 69 | 69 |
| zone 9 | 70 | 70 | 70 | 70 | 70 | 70 | 70 | 70 | 70 | 70 | 70 | 70 |
| Torque (%) | 18 | 31 | 31 | 31 | 19 | 19 | 19 | 19 | 19 | 19 | 19 | 19 |
| Ratio Solid Surfactant/PHA | 0.080 | 0.126 | 0.126 | 0.168 | 0.138 | 0.125 | 0.113 | 0.107 | 0.107 | 0.076 | 0.096 | 0.087 |
| % Surfactant Solids | 4.0 | 5.7 | 5.4 | 6.5 | 5.7 | 5.2 | 5.1 | 4.8 | 4.8 | 3.6 | 4.3 | 4.1 |
| Calculated % Total Solids | 53.9 | 51.1 | 48.1 | 44.9 | 46.6 | 46.9 | 49.8 | 50.0 | 50.0 | 51.0 | 49.0 | 51.5 |
| Latex Stability/Appearance | Good | Good | Good | Good | Good | Good | Good | Good | Good | Good | Good | Good |
| Mean Particle Diameter (μm) | 1.29 | 1.78 | 1.65 | 1.47 | 1.44 | 1.38 | 1.57 | 1.76 | 1.70 | 1.8 | 1.66 | 1.51 |

\* PHA A: Poly-(3-hydroxybutyrate- co-8-14%-4-hydroxybutyrate). $M_w$ ~350,000;

PHA B: Blend of 18-22% P3HB and 78-82% P3HB-4HB copolymer with 8-14% 4KB by weight. $M_w$ ~385,000;

PHA C: Blend of 34-38% P3HB, 22-26% P3HB-4HB copolymer with 8-14% 4HB by weight and 38-42% P3HB-4HB copolymer with 25-33% 4KB by weight. $M_w$ ~379,000;

PHA D: Poly-(3-hydroxybutyrate-co-11%-4-hydroxybutyrate). $M_w$ ~658,000

EXAMPLE 13

Effect of Various Surfactants, Additives and Material Feed Rates on Production of PHA Latex In this example, PHA latex samples were produced using PHA A melt mixed with two types of surfactants: a polyvinyl alcohol surfactant solution (POVAL® 403, 78-82% hydrolyzed, Kuraray Co.) and an anionic surfactant (potassium oleate, Sigma Aldrich). The surfactants were added to PHA A at several different feed rates. In addition, a polyvinyl acetate homopolymer (DUR-O-SET® C310, 54% solids content, viscosity 1200 cps, Celanese) was included as part of the PHA latex formulation. A latex sample of PHA A melt mixed

TABLE 6

Summary of PHA formulations, processing condition and latex particle size vs. surfactant type, surfactant feed rate and polyvinyl acetate addition.

| | Sample ID | | | |
|---|---|---|---|---|
| | E1 | E2 | E3 | E4 |
| PHA A* (lbs/hr) | 50 | 50 | 50 | 50 |
| 30% POVAL ® 403 (lbs/hr) | 13.8 | 13.8 | 11.8 and 2 (split feed) | 13.8 |
| Potassium Oleate (lbs/hr) | | 0.5 | | |
| DUR-O-SET ® C310 (lbs/hr) | | | | 5.0 |

TABLE 6-continued

Summary of PHA formulations, processing condition and latex particle size vs. surfactant type, surfactant feed rate and polyvinyl acetate addition.

| | Sample ID | | | |
|---|---|---|---|---|
| | E1 | E2 | E3 | E4 |
| Water (lbs/hr) | 29.4 | 29.4 | 29.4 | 26.7 |
| Total Feed Rate (lbs/hr) | 93.2 | 93.7 | 93.2 | 95.5 |
| Calculated % Total Solids | 58.1 | 58.6 | 58.1 | 59.5 |
| Latex Stability/ Appearance | Fine emulsion | Fine emulsion | Fine emulsion | Fine emulsion |
| Mean Particle Diameter (μm) | 1.65 | 1.60 | 1.55 | 1.60 |

*PHA A: Poly-(3-hydroxybutyrate-co-8-14%-4-hydroxybutyrate).
$M_w \sim 350,000$

Sample E2 showed a PHA latex formulation with addition of a small amount of the anionic surfactant potassium oleate which was added to the extruder at the same feedport as the solid PHA A and at a 1% loading based on polymer feed. The addition of the anionic surfactant to the formulation was carried out in order to assist in the water in PHA emulsification. The data for this sample showed that the mean particle diameter was marginally reduced showing some slight improvement in the processing characteristics. Film formation and adhesion properties to paper and wood were unchanged.

Sample E3 demonstrated the ability to split the addition of the surfactant solution fed to the process with ~90% going into the second stage where the water in molten polymer emulsification was formed and the remaining 10% added at the third stage with the remaining water at the PHA-in-water inversion point. Torque and particle size were found to be both slightly reduced indicating potentially a more effective inversion stage.

Sample E4 investigated the ability of blending a second emulsion of polyvinyl acetate (DUR-O-SET® C310, Celanese) with the PHA resin during emulsification process. Polyvinyl acetate (PVAc) is known to be miscible with polyhydroxyalkanoate polymers (see International patent publication WO2011031558). The process to form the PHA latex in Example E4 was identical to that used in Example E1 with the polyvinyl acetate emulsion being added in the third stage during water addition. A good PHA latex emulsion was obtained with very little change to the particle size or appearance as compared to the PHA latex control. The mean particle size of the polyvinyl acetate emulsion was 1.6 μm so no influence on addition of the PVA to the particle size distribution was observed. A comparable experiment was carried out where the PVAc emulsion was post added to the latex after cooling. No difference in performance properties around film forming and adhesion to paper and wood substrates were observed.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for producing an aqueous polyhydroxyalkanoate (PHA) emulsion from a biobased, biodegradable PHA polymer, copolymer or blend thereof, comprising the steps of:
    melting the PHA polymer, copolymer or blend thereof to form a molten PHA polymer, copolymer or blend thereof;
    lowering the temperature of the molten PHA polymer, copolymer or blend thereof to about 20° C. to about 50° C. below the melting temperature (Tm) of the highest melting polymer component of the PHA polymer, copolymer or blend thereof to obtain a lower-temperature PHA polymer, copolymer or blend thereof;
    combining the lower-temperature PHA polymer, copolymer or blend thereof and an aqueous colloid stabilizer solution heated to about 60° C. to about 90° C. under high distributive mixing thereby forming a water-in-PHA emulsion;
    lowering the temperature of the water-in-PHA emulsion by about 20° C. to about 50° C; and
    adding water and optionally one or more polymeric dispersants or surfactants producing an aqueous PHA emulsion having a ratio of colloid stabilizer to PHA polymer of 0.1 to 8 parts to 100 parts by dry weight PHA polymer.

2. The method of claim 1, wherein the aqueous PHA emulsion comprises a 3-hydroxybutyrate polymer, copolymer or blends thereof.

3. The method of claim 1 or claim 2, wherein the aqueous PHA emulsion comprises 4-hydroxybutyrate polymer, copolymer or blends thereof.

4. The method of claim 1, wherein the aqueous PHA emulsion comprises a 3-hydroxybutyrate-co-4-hydroxybutyrate copolymer.

5. The method of claim 1, wherein the aqueous PHA emulsion comprises a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), or a poly(3-hydroxybutyrate-co-3-hydroxyhexanoate) or blends thereof.

6. The method of claim 1, wherein the aqueous PHA emulsion comprises a poly(3-hydroxybutyrate) homopolymer, a poly(3-hydroxybutyrate-co-4-hydroxybutyrate) with 5% to 15% 4-hydroxybutyrate content, a poly(3-hydroxybutyrate-co-3-hydroxyvalerate) with 5% to 22% 3-hydroxyvalerate content, a poly(3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content or blends thereof.

7. The method of claim 1, wherein the aqueous PHA emulsion comprises a) a poly(3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyvalerate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate); a) a poly(3-hydroxybutyrate-co-4-hydroxybutyrate) blended with b) a poly(3-hydroxybutyrate-co-3-hydroxyhexanoate) or a) a poly(3-hydroxybutyrate-co-3-hydroxyvalerate) blended with b) a poly(3-hydroxybutyrate-co-3-hydroxyhexanoate).

8. The method of claim 1, wherein the aqueous PHA emulsion comprises a) a poly(3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content.

9. The method of claim 1, wherein the aqueous PHA emulsion comprises a) a poly(3-hydroxybutyrate) homopolymer blended with b) a poly(3-hydroxybutyrate-co-4-hydroxybutyrate) and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) can be 5% to 95% of the combined weight of polymer a) and polymer b); a) a poly(3-hydroxybutyrate) homopolymer blended to with b) a poly(3-hydroxybutyrate-co-3-hydroxyhexanoate) and the weight of polymer a) can be 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) can be 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) can be 5% to 95% of the combined weight of polymer a) and polymer b); or a) a poly(3-hydroxybutyrate-co-3-hydroxyvalerate) blended with b) a poly(3-hydroxybutyrate-co-3-hydroxyhexanoate) and the weight of polymer a) can be 5% to 95% of the combined weight of polymer a) and polymer b).

10. The method of claim 9, wherein the weight of polymer a) is 20% to 60% of the combined weight of polymer a) and polymer b) and the weight of polymer b) or 40% to 80% of the combined weight of polymer a) and polymer b).

11. The method of claim 1, wherein the aqueous PHA emulsion comprises a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co-3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b) a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content.

12. The method of claim 1, wherein the aqueous PHA emulsion comprises a) a poly(3-hydroxybutyrate) homopolymer blended with b) a poly(3-hydroxybutyrate-co-4-hydroxybutyrate) with a 20-50% 4-hydroxybutyrate content and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b);a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) can be 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) can be 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) can be 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) can be 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b).

13. The method of claim 12, wherein the aqueous PHA emulsion comprises 20% to 60% of the combined weight of polymer a) and polymer b) and the weight of polymer b can be 40% to 80% of the combined weight of polymer a) and polymer b).

14. The method of claim 12, wherein polymer a) and polymer b) are further blended with polymer c) a poly(3-hydroxybutyrate-co-4-hydroxybutyrate) with a 20% to 50% 4-hydroxybutyrate content.

15. The method of claim 12, wherein polymer a) and polymer b) are blended with c) a poly(3-hydroxybutyrate-co-5-hydroxyvalerate) with a 20% to 50% 5-hydroxyvalerate content.

16. The method of claim 12, wherein polymer a) and polymer b) are blended with with c) a poly(3-hydroxybutyrate-co-3-hydroxyhexanoate) with a 5% to 50% 3-hydroxyhexanoate content.

17. A method of claim 1, wherein the aqueous PHA emulsion is processed using a counter-rotating or co-rotating twin screw extruder.

18. The method of claim 1, wherein the aqueous PHA emulsion comprises a blend of poly(3-hydroxybutyrate) with one or more other PHA copolymers and optionally a non PHA polymer.

19. A method for producing an aqueous PHA emulsion from a biobased, biodegradable polyhydroxyalkanoate according to claim 18, wherein the PHA is a copolymer of poly(3-hydroxybutyrate-co-8-14%-4-hydroxybutyrate).

20. A method for producing an aqueous PHA emulsion from a biobased, biodegradable polyhydroxyalkanoate according to claim 18 wherein the non-PHA polymer is selected from polycaprolactone, aliphatic polyesters derived from the condensation polymerization of a diol and a diacid wherein the diol comprises butanediol, ethylene glycol, polyethylene glycol, 1,2-hexane diol, 1,2-propane diol, 1,3-propylene glycol and the diacid comprises at least one of adipic acid, succinic acid or terephthalic acid, polyvinyl acetate, vinyl acetate copolymerized with ethylene, vinyl acetate copolymerized with acrylate or methacrylate monomers having at least 50% vinyl acetate content, an acrylate or methacrylate homopolymers or copolymers with optional styrene, starch, casein, hydroxymethylcellulose or other biobased polymer.

21. A method for producing an aqueous PHA emulsion according to claim 18, wherein the non-PHA polymer is a dispersant.

22. A method for producing an aqueous PHA emulsion from a biobased, biodegradable polyhydroxyalkanoate according to claim 1, wherein the aqueous colloid stabilizer solution comprises about 1% to about 50% aqueous solution of polyvinyl alcohol, partially hydrolysed polyvinyl alcohol or partially saponified polyvinyl alcohol.

23. A method for producing an aqueous PHA emulsion from a biobased, biodegradable polyhydroxyalkanoate according to claim 1, wherein the aqueous colloid stabilizer solution comprises about 1% to about 50% aqueous solution of vinyl alcohol, partially hydrolysed vinyl alcohol or partially saponified vinyl alcohol.

24. A method for producing an aqueous PHA emulsion from a biobased, biodegradable polyhydroxyalkanoate according to claim 1, wherein a surfactant in the aqueous colloid stabilizer solution is comprised of soaps of fatty acids, pyrrolidones, ethylene oxides or propylene oxides.

25. A method for producing an aqueous PHA emulsion from a biobased, biodegradable polyhydroxyalkanoate according to claim 24, wherein the surfactant in the aqueous colloid stabilizer solution has a cloud point greater than 90° C.

26. The method for producing an aqueous PHA emulsion from a biobased, biodegradable polyhydroxyalkanoate according to claim 1, wherein the ratio of the viscosity of the molten PHA to the surfactant solution is greater than 180.

27. A method for producing an aqueous PHA emulsion from a biobased, biodegradable polyhydroxyalkanoate according to claim 1, wherein the molecular weight of the PHA is from about 300,000 daltons to about 800,000 daltons.

28. A method for producing an aqueous PHA emulsion from a biobased, biodegradable polyhydroxyalkanoate according to claim 2, wherein the melting temperature of the PHA is about 140° C. to about 170° C.

29. A method for producing an aqueous PHA emulsion from a biobased, biodegradable polyhydroxyalkanoate according to claim 1, wherein the percent solids in the PHA latex are 30 to 70% by weight.

30. A method for producing an aqueous PHA emulsion from a biobased, biodegradable polyhydroxyalkanoate according to claim 1, wherein the mean or median particle size of the PHA solids is less than 20 µm.

31. A method for producing a aqueous PHA emulsion from a biobased, biodegradable polyhydroxyalkanoate according to claim 1, further including additives selected from the group consisting of pigments, texturizers, UV stabilizers, inorganic fillers and biocides, wherein the additives are included post emulsification.

32. The method of claim 1, wherein the aqueous PHA emulsion comprises polyhydroxylbutyrate (PHB) and at least two PHA copolymers, wherein each copolymer has a first and a second monomer, wherein the second copolymer has an increasing weight fraction of the second PHA monomer than the first copolymer, and the third copolymer has an increasing weight fraction of the second PHA monomer than the second copolymer.

33. The method of claim 32, wherein the second monomer is 4-hydroxybutyrate (4HB), 3-hydroxyhexanoate (3HH), 3-hydroxyhexanoate (5HV) or 3-hydroxyoctanoate (3HO).

34. The method of claim 32, wherein the first monomer is 3HB.

* * * * *